United States Patent
Saitoh et al.

(10) Patent No.: US 12,248,179 B2
(45) Date of Patent: Mar. 11, 2025

(54) OPTICAL COUPLING SYSTEM AND OPTICAL COMMUNICATION DEVICE

(71) Applicant: FUJIFILM Corporation, Tokyo (JP)

(72) Inventors: Yukito Saitoh, Minamiashigara (JP); Makoto Kamo, Minamiashigara (JP); Megumi Sekiguchi, Minamiashigara (JP); Yujiro Yanai, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/633,938

(22) Filed: Apr. 12, 2024

(65) Prior Publication Data

US 2024/0272362 A1     Aug. 15, 2024

Related U.S. Application Data

(63) Continuation of application No. PCT/JP2022/038355, filed on Oct. 14, 2022.

(30) Foreign Application Priority Data

Oct. 15, 2021 (JP) ................. 2021-169597

(51) Int. Cl.
G02B 6/27         (2006.01)
(52) U.S. Cl.
CPC .................. G02B 6/2713 (2013.01)
(58) Field of Classification Search
CPC .................................................. G02B 6/2713
See application file for complete search history.

(56) References Cited

U.S. PATENT DOCUMENTS

2006/0039645 A1* 2/2006 Uesugi ............ G02B 6/352
                                                         385/18
2012/0188467 A1   7/2012 Escuti et al.
(Continued)

FOREIGN PATENT DOCUMENTS

CN    113176554 A    7/2021
JP    2013-205761 A  10/2013
(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2022/038355, dated Apr. 25, 2024, with an English translation.
(Continued)

Primary Examiner — Joseph L Williams
(74) Attorney, Agent, or Firm — Birch, Stewart, Kolasch & Birch, LLP

(57) ABSTRACT

An object is to provide an optical coupling system having a simplified structure and a small size and an optical communication device using the optical coupling system. The object is achieved by an optical coupling system that couples a multi-core fiber and coupled devices to each other using a combination of a polarized light beam control element facing a light incident and emission surface of a multi-core fiber and a polarization-selective diffraction element that is positioned on a side of the polarized light beam control element opposite to the emission surface of the multi-core fiber and that faces the coupled devices.

13 Claims, 7 Drawing Sheets

(56) References Cited

U.S. PATENT DOCUMENTS

2016/0154247 A1 6/2016 Liu et al.
2018/0143508 A1 5/2018 Uetsuka et al.

FOREIGN PATENT DOCUMENTS

| JP | 2014-219428 A | 11/2014 |
|---|---|---|
| JP | 2016-103021 A | 6/2016 |
| JP | 2019-82518 A | 5/2019 |
| WO | WO 2016/175071 A1 | 11/2016 |

OTHER PUBLICATIONS

International Search Report (Form PCT/ISA/210) for International Application No. PCT/JP2022/038355, dated Dec. 20, 2022, with an English translation.

* cited by examiner

OPTICAL COUPLING SYSTEM AND OPTICAL COMMUNICATION DEVICE

CROSS-REFERENCE TO RELATED APPLICATIONS

This application is a Continuation of PCT International Application No. PCT/JP2022/038355 filed on Oct. 14, 2022, which claims priority under 35 U.S.C. § 119(a) to Japanese Patent Application No. 2021-169597 filed on Oct. 15, 2021. The above applications are hereby expressly incorporated by reference, in their entirety, into the present application.

BACKGROUND OF THE INVENTION

1. Field of the Invention

The present invention relates to an optical coupling system and an optical communication device using the optical coupling system.

2. Description of the Related Art

Multi-core fibers have been studied in order to deal with a rapid increase in a transmission capacity in recent years and a transmission capacity limit per optical fiber. A multi-core fiber, as indicated by its name, has a plurality of cores. Thus, in coupling the multi-core fiber to a device such as a signal transmitter and receiver, each core is coupled to a single-core fiber, and then each single-core fiber is connected to each device (for example, refer to JP2013-205761A and JP2014-219428A).

SUMMARY OF THE INVENTION

In the fan-out module in JP2013-205761A, the single-core fiber connected to each core of the multi-core fiber is drawn to each device, and incorporating the single-core fiber into the device such as the transmitter and receiver is not considered. In addition, in the connection device (a coupling structure of the multi-core fiber) in JP2014-219428A, a plurality of lenses and mirrors are combined with each other. Thus, the structure is complicated.

Therefore, an object of the present invention is to provide an optical coupling system that can be incorporated into a device and that has a simple structure.

In addition, another object of the present invention is to provide an optical communication device using the optical coupling system.

The present inventors have found that the objects can be achieved by the following configurations.

[1] An optical coupling system includes a polarized light beam control element facing a light incident and emission surface of a multi-core fiber, a polarization-selective diffraction element positioned on a side of the polarized light beam control element opposite to the emission surface of the multi-core fiber, and a plurality of coupled devices having light incident and emission surfaces facing the polarization-selective diffraction element.

[2] In the optical coupling system according to [1], the polarized light beam control element is a liquid crystal diffraction element including an optically anisotropic layer having a liquid crystal alignment pattern in which a direction of an optical axis derived from a liquid crystal compound changes while continuously rotating in at least one direction in plane.

[3] In the optical coupling system according to [1] or [2], the polarization-selective diffraction element is a liquid crystal diffraction element including an optically anisotropic layer having a liquid crystal alignment pattern in which a direction of an optical axis derived from a liquid crystal compound changes while continuously rotating in at least one direction in plane.

[4] An optical communication device includes the optical coupling system according to any of [1] to [3].

According to the present invention, an optical coupling system that can be incorporated into a device and that has a simple structure can be provided.

In addition, according to the present invention, an optical communication device corresponding to a multi-core fiber using the optical coupling system can be provided.

DESCRIPTION OF THE PREFERRED EMBODIMENTS

Hereinafter, the present invention will be described in detail.

While description of configuration requirements below may be provided based on a representative embodiment of the present invention, the present invention is not limited to the embodiment.

In the present specification, a numerical value range represented using "to" means a range including numerical values before and after "to" as a lower limit value and an upper limit value.

<Optical Coupling System>

In a preferable aspect of an optical coupling system according to the embodiment of the present invention, the optical coupling system includes a polarized light beam control element facing a light incident and emission surface of a multi-core fiber, a polarization-selective diffraction element positioned on a side of the polarized light beam control element opposite to the emission surface of the multi-core fiber, and a plurality of coupled devices having light incident and emission surfaces facing the polarization-selective diffraction element.

Figure 1:
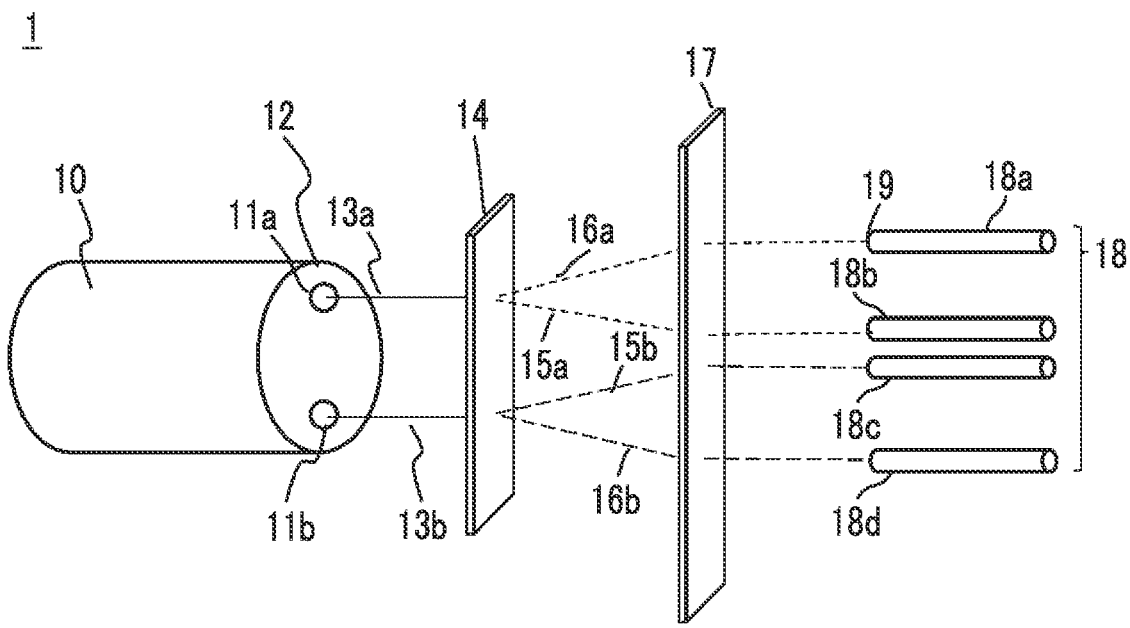
FIG. 1 is a conceptual diagram of an example of an optical coupling system according to an embodiment of the present invention.

FIG. 1 is a conceptual diagram of an example of the optical coupling system according to the embodiment of the present invention.

An optical coupling system 1 in the illustrated example includes a multi-core fiber 10, a polarized light beam control element 14, a polarization-selective diffraction element 17, and four coupled devices 18 (a coupled device 18a to a coupled device 18d).

While the multi-core fiber 10 and the polarized light beam control element 14 are spaced from each other in the example illustrated in FIG. 1, the present invention is not limited thereto. That is, in the optical coupling system according to the embodiment of the present invention, the multi-core fiber 10 and the polarized light beam control element 14 may be in contact with each other.

The multi-core fiber 10 in the illustrated example includes two cores of a core 11a and a core 11b in a clad.

In the illustrated example, the multi-core fiber 10 including the two cores 11a and 11b disposed on a straight line is illustrated for clear illustration of a configuration of the multi-core fiber 10. However, various well-known types of the multi-core fiber can be used in the present invention. Accordingly, the core disposition in the clad can adopt well-known dispositions.

Examples of the core disposition include dispositions including four cores, six cores, seven cores, eight cores, and more cores. For example, a core disposition according to JP2017-75061A, JP2015-212791A, JP2014-126575A, JP2012-215695A, JP2011-170336A, and JP1998-104443A (JP-H10-104443A) can be adopted.

The multi-core fiber 10 has a light incident and emission surface 12.

The light incident and emission surface 12 is an incident surface of light in a case where light is incident on the multi-core fiber side, and is conversely an emission surface of light in a case where light is emitted from the multi-core fiber. The light incident and emission surface 12 matches a cross section of the multi-core fiber orthogonal to a longitudinal direction of the multi-core fiber.

In order to improve coupling efficiency of light, antireflection coating or polishing processing may be performed on the light incident and emission surface of the multi-core fiber 10, as necessary.

Hereinafter, FIG. 1 will be described using a mode in which light travels toward the coupled devices 18 from the multi-core fiber 10 in the optical coupling system 1 as an example.

In this mode, a luminous flux 13a (signal light) and a luminous flux 13b (signal light) are emitted from the core 11a and the core 11b of the light incident and emission surface 12 of the multi-core fiber 10, respectively.

The luminous flux 13a emitted from the core 11a and the luminous flux 13b emitted from the core 11b of the light incident and emission surface 12 of the multi-core fiber 10 are incident on the polarized light beam control element 14.

In a case where the luminous flux 13a and the luminous flux 13b are incident on the polarized light beam control element 14, the polarized light beam control element 14, in accordance with its polarization selectivity, spatially separates the incident luminous fluxes into a luminous flux 15a and a luminous flux 15b of a first polarization state and a luminous flux 16a and a luminous flux 16b of a second polarization state having an orthogonal relationship with the first polarization state. In the illustrated example, the luminous flux 13a emitted from one core 11a is spatially separated into the luminous flux 15a of the first polarization state and the luminous flux 16a of the second polarization state by the polarized light beam control element 14. In addition, the luminous flux 13b emitted from the other core 11b is spatially separated into the luminous flux 15b of the first polarization state and the luminous flux 16b of the second polarization state by the polarized light beam control element 14.

For example, a polarization-selective diffraction element and a polarization-selective geometric-phase hologram element can be used as the polarized light beam control element 14.

For example, the geometric-phase hologram element disclosed in JP2016-519327A can be used as an element that separates incident light into levorotatory circularly polarized light as the first polarization state and dextrorotatory circularly polarized light as the second polarization state having an orthogonal relationship with the first polarization state. Examples of the geometric-phase hologram element include a liquid crystal diffraction element, described later.

The luminous flux 15a and the luminous flux 16a and the luminous flux 15b and the luminous flux 16b, which are spatially separated, are incident on the polarization-selective diffraction element 17 to be subjected to an optical path control and are coupled to (incident on) light incident and emission surfaces 19 of their corresponding coupled devices 18 among the plurality of (in the illustrated example, four) coupled devices 18.

Specifically, out of the two luminous fluxes into which the luminous flux 13a is separated, the luminous flux after the luminous flux 15a is transmitted through the polarization-selective diffraction element 17 is coupled to the coupled device 18b, and the luminous flux after the luminous flux 16a is transmitted through the polarization-selective diffraction element 17 is coupled to the coupled device 18a. Meanwhile, out of the two luminous fluxes into which the luminous flux 13b is separated, the luminous flux after the luminous flux 15b is transmitted through the polarization-selective diffraction element 17 is coupled to the coupled device 18c, and the luminous flux after the luminous flux 16b is transmitted through the polarization-selective diffraction element 17 is coupled to the coupled device 18d.

In FIG. 1, the polarization-selective diffraction element 17 performs the optical path control such that optical paths of the four luminous fluxes are parallel to each other. However, in the optical coupling system according to the embodiment of the present invention, the optical paths of the luminous fluxes may be controlled to be at any position in any direction by configuring the polarization-selective diffraction element 17 in accordance with the disposition of the plurality of coupled devices 18.

A well-known type of the polarization-selective diffraction element 17 can be used. Examples of the well-known type include a liquid crystal diffraction element according to JP2010-525394A. The liquid crystal diffraction element has a configuration described later and can be produced using a production method described later.

Here, as will be described later, in a case where the liquid crystal diffraction element is used as the polarization-selective diffraction element 17, a polarization state of a luminous flux transmitted through the polarization-selective diffraction element 17 is converted into a polarization state having an orthogonal relationship. That is, for example, the dextrorotatory circularly polarized light is converted into the levorotatory circularly polarized light, and the levorotatory circularly polarized light is converted into the dextrorotatory circularly polarized light.

In addition, for example, it is assumed that the above liquid crystal diffraction element which separates the luminous fluxes emitted by the cores of the multi-core fiber 10 into the luminous flux of the first polarization state and the luminous flux of the second polarization state having an orthogonal relationship with the first polarization state is used as the polarized light beam control element 14.

In this case, in a case where the luminous flux 13a emitted from the core 11a is incident on the polarized light beam control element 14, the luminous flux 13a is separated into the luminous flux 15a of the first polarization state and the luminous flux 16a of the second polarization state, as described above.

Meanwhile, in a case where the luminous flux 13b emitted from the core 11b is incident on the polarized light beam control element 14, the luminous flux 13b is separated into the luminous flux 15b of the first polarization state and the luminous flux 16b of the second polarization state, as described above.

The luminous flux 15a of the first polarization state and the luminous flux 16a of the second polarization state separated from the luminous flux 13a are then incident on the polarization-selective diffraction element 17.

The luminous flux 15a of the first polarization state is transmitted through the polarization-selective diffraction element 17 to be subjected to the optical path control and to be converted into a luminous flux of the second polarization state and is coupled to the coupled device 18b. Meanwhile, the luminous flux 16a of the second polarization state is transmitted through the polarization-selective diffraction element 17 to be subjected to the optical path control and to be converted into a luminous flux of the first polarization state and is coupled to the coupled device 18a.

In addition, the luminous flux 15b of the first polarization state and the luminous flux 16b of the second polarization state separated from the luminous flux 13b are also incident on the polarization-selective diffraction element 17. The luminous flux 15b of the first polarization state is transmitted through the polarization-selective diffraction element 17 to be subjected to the optical path control and to be converted into a luminous flux of the second polarization state and is coupled to the coupled device 18c. Meanwhile, the luminous flux 16b of the second polarization state is transmitted through the polarization-selective diffraction element 17 to be subjected to the optical path control and to be converted into a luminous flux of the first polarization state and is coupled to the coupled device 18d.

The coupled devices 18 are not limited, and any of various well-known types of the coupled devices 18 that can receive light can be used.

Specifically, examples of the coupled devices 18 include a single-core fiber, an optical receiver, a photonic chip, and a photodiode. Optical polishing processing, antireflection coating, and the like may be performed on the light incident and emission surfaces of the coupled devices 18, as necessary.

The above example describes the mode in which light travels from the multi-core fiber 10 side to the plurality of coupled devices 18 side.

In the optical coupling system 1 according to the embodiment of the present invention, a mode in which light travels from the plurality of coupled devices 18 side to the multi-core fiber 10 side in the opposite manner to the above mode is also possible.

In this mode, each luminous flux emitted from the light incident and emission surface 19 of each of the four (plurality of) coupled devices 18 is subjected to the optical path control by the polarization-selective diffraction element 17 and is incident on the polarized light beam control element 14. The four luminous fluxes incident on the polarized light beam control element 14 are coupled into two luminous fluxes by the polarized light beam control element 14.

Out of the two luminous fluxes emitted from the polarized light beam control element 14, one luminous flux is coupled to (incident on) the core 11a of the multi-core fiber 10, and the other luminous flux is coupled to (incident on) the core 11b of the multi-core fiber 10.

In this mode, the optical paths of the luminous fluxes emitted from the coupled devices 18 are opposite to the optical paths in the mode in which light travels from the multi-core fiber 10 side to the plurality of coupled devices 18 side.

For example, as described above, it is assumed that the above liquid crystal diffraction element is used as the polarized light beam control element 14 and the polarization-selective diffraction element 17. In addition, it is assumed that the coupled device 18a emits a luminous flux of the first polarization state, and the coupled device 18b emits a luminous flux of the second polarization state having an orthogonal relationship with the first polarization state.

The luminous flux of the first polarization state emitted from the coupled device 18a and the luminous flux of the second polarization state emitted from the coupled device 18b are subjected to the optical path control to be in directions coming close to each other by the polarization-selective diffraction element 17 and are incident at the same position of the polarized light beam control element 14.

Here, the luminous flux of the first polarization state emitted from the coupled device 18a is transmitted through the polarization-selective diffraction element 17 to be converted into a luminous flux of the second polarization state. In addition, the luminous flux of the second polarization state emitted from the coupled device 18b is transmitted through the polarization-selective diffraction element 17 to be converted into a luminous flux of the first polarization state.

The luminous flux of the first polarization state and the luminous flux of the second polarization state subjected to the optical path control by the polarization-selective diffraction element 17 to be incident at the same position of the polarized light beam control element 14 are diffracted into one luminous flux by the polarized light beam control element 14.

This luminous flux of unpolarized light is coupled to the core 11a of the multi-core fiber 10.

The luminous fluxes of the first polarization state and the second polarization state emitted from the coupled device 18d and the coupled device 18c are also subjected to the optical path control and polarization state conversion by the polarization-selective diffraction element 17 and are incident at the same position of the polarized light beam control element 14.

The two luminous fluxes incident on the polarized light beam control element 14 are diffracted into one luminous flux by the polarized light beam control element 14, and the luminous flux is coupled to the core 11b of the multi-core fiber 10.

The coupled devices 18 in this mode are also not limited, and any of various well-known types of the coupled devices 18 that can emit light can be used.

Examples of the coupled devices corresponding to this mode include a single-core fiber, an optical transmitter, a light source, and a photonic chip.

Each of the mode in which the luminous flux travels from the multi-core fiber 10 side to the coupled devices 18 side and the mode in which the luminous flux travels from the coupled devices 18 side to the multi-core fiber 10 side in the optical coupling system 1 illustrated in FIG. 1 has been described above.

Here, the optical coupling system according to the embodiment of the present invention may be configured such that only one of the two modes act, and may also be configured such that the two modes act at the same time.

Unlike the optical coupling system including a long drawn part of a single-mode fiber as illustrated in JP2013-205761A and the optical coupling system in which optical elements such as a prism, a lens, and a mirror are combined with each other in a complicated manner as illustrated in JP2014-219428A, the optical coupling system of the above preferable aspect has a simple structure with a high degree of freedom in selecting the coupled devices and is easily incorporated into various devices. This is highly advantageous in terms of mounting in a device such as an optical communication system including an optical coupling system.

<Liquid Crystal Diffraction Element>

As described above, in the optical coupling system according to the embodiment of the present invention, the liquid crystal diffraction element is suitably used as the polarized light beam control element 14 and the polarization-selective diffraction element 17.

As the liquid crystal diffraction element that can be used in the optical coupling system according to the embodiment of the present invention, a liquid crystal diffraction element including an optically functional layer having a liquid crystal alignment pattern in which an optical axis derived from a liquid crystal compound changes in plane can be used. Examples of this liquid crystal diffraction element include the transmissive type liquid crystal diffraction element illustrated in FIG. 2 in JP2017-522601A and the reflective type liquid crystal diffraction element illustrated in FIG. 4 in JP2017-522601A.

This liquid crystal diffraction element is a thin sheet-shaped element in which the liquid crystal compound (a compound including mesogen) is fixed in a predetermined alignment state. The liquid crystal diffraction element can be further combined with a retardation layer, a prism layer, and a microlens layer, as necessary.

In the optical coupling system according to the embodiment of the present invention using this liquid crystal diffraction element, the thin sheet-shaped element can replace functions of a lens, a prism, a mirror, and the like that are combined with an optical coupling system known in the related art as illustrated in JP2013-205761A and JP2014-219428A. Consequently, the optical coupling system according to the embodiment of the present invention can be further simplified and reduced in size. This is highly advantageous in terms of mounting in a device such as an optical communication system including an optical coupling system.

The liquid crystal diffraction element (optically functional layer) having the liquid crystal alignment pattern changing in plane can be obtained by fixing the liquid crystal compound in the predetermined alignment state.

Fixing of the alignment state may use an electric field, a magnetic field, and the like or may use a phase transition, crosslinking, polymerization, and the like of the liquid crystal compound.

In a case where an electric field, a magnetic field, and the like are used for fixing the alignment state, switching ON/OFF and spatial separation of each beam may be adjusted by controlling the electric field or the magnetic field to be applied. In a case where a phase transition, crosslinking, polymerization, and the like of the liquid crystal compound are used for fixing the alignment state, various compounds showing liquid crystallinity can be used as the liquid crystal compound. However, it is preferable to use a polymerizable liquid crystal compound in terms of being able to maintain stable optical characteristics over a long term. The liquid crystal diffraction element used in the present invention is particularly preferably an element in which a composition including a polymerizable liquid crystal compound is set to have the predetermined alignment state and then the alignment state is fixed through polymerization or crosslinking. These elements can be produced using a method according to JP2017-522601A, WO2019/189852A, and the like.

Figure 2:
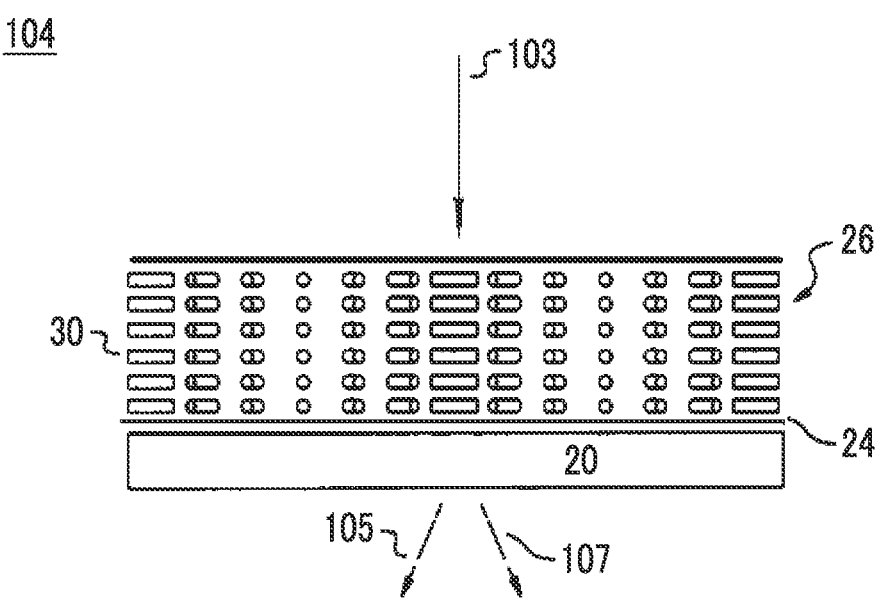
FIG. 2 is a conceptual diagram of an example of a liquid crystal diffraction element used in the optical coupling system according to the embodiment of the present invention.

FIG. 2 illustrates a conceptual diagram of the liquid crystal diffraction element having the fixed alignment state and the liquid crystal alignment pattern in which the optical axis of the liquid crystal compound changes in plane.

A liquid crystal diffraction element 104 illustrated in FIG. 2 includes an alignment film 24 on a support 20 (transparent substrate 20), and an optically anisotropic layer 26 which is the optically functional layer is provided on the alignment film 24. The optically anisotropic layer 26 includes liquid crystal compounds 30 having alignment states fixed to optical axes (major axis directions of the rods in FIG. 2) that change in any plane laterally passing through the optically anisotropic layer 26.

As will be described in detail later, arrangement of the liquid crystal compounds 30 having the fixed alignment forms a distribution of refractive index anisotropy in the optically anisotropic layer 26 and applies a polarization-selective diffraction action to signal light 103 (the luminous flux 13a and the luminous flux 13b) from the core 11a and the core 11b of the multi-core fiber 10. Accordingly, the incident signal light 103 is spatially separated into signal light 105 that is negative first order light and signal light 107 that is first order light.

The liquid crystal diffraction element 104 in FIG. 2 is typically an optically functional layer that separates the incident signal light 103 into two rays of circularly polarized light having different rotation directions from each other. However, in a case where the incident signal light 103 is multiple modes of linearly polarized light orthogonal to each other, each of two multiplexed linearly polarized light components can be spatially separated and extracted by adding an incidence side λ/4 wavelength plate or an emission side λ/4 wavelength plate, not illustrated. This point also applies to the example illustrated in FIG. 3, described later.

How the negative first order light and the first order light (or zero order light may be used) are spatially separated to have which polarization state in which alignment state of the liquid crystal compounds 30 can be analyzed using the Jones method (R. C. Jones, J. Opt. Soc. Am. 31, 488, 1941) according to JP2004-341024A.

Figure 3:
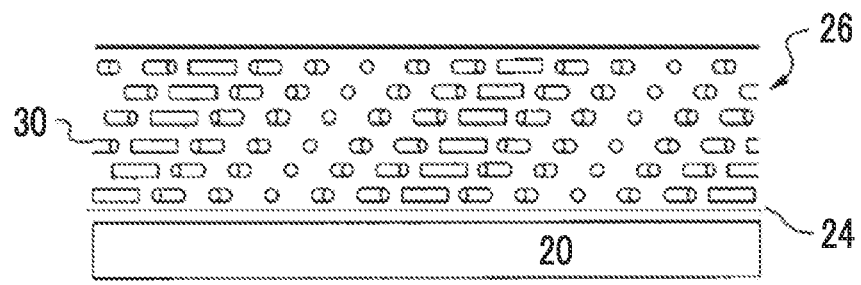
FIG. 3 is a conceptual diagram of another example of the liquid crystal diffraction element used in the optical coupling system according to the embodiment of the present invention.

FIG. 3 conceptually illustrates another example of the transmissive type liquid crystal diffraction element.

The liquid crystal diffraction element 104 illustrated in FIG. 3 also includes, for example, the support 20, the alignment film 24, and the optically anisotropic layer 26.

Here, the liquid crystal diffraction element illustrated in FIG. 2 and the liquid crystal diffraction element illustrated in FIG. 3 have different lamination states (alignment states) of liquid crystals in a thickness direction. That is, in the optically anisotropic layer 26 of the liquid crystal diffraction element 104 illustrated in FIG. 2, the liquid crystal compounds 30 are arranged by laminating the liquid crystal compounds 30 in the thickness direction. Meanwhile, in the optically anisotropic layer 26 of the liquid crystal diffraction element 104 illustrated in FIG. 3, the liquid crystal compounds 30 are arranged by laminating the liquid crystal compounds 30 in an oblique direction with respect to the thickness direction.

In the liquid crystal diffraction element 104 illustrated in FIGS. 2 and 3, the optically anisotropic layer 26 is formed using a composition including the liquid crystal compounds 30. The optically anisotropic layer 26 in any of FIGS. 2 and 3 has the liquid crystal alignment pattern in which directions of the optical axes derived from the liquid crystal compounds 30 changes while continuously rotating in at least one direction in plane in an in-plane direction, and the liquid crystal alignment pattern also changes while rotating in the thickness direction.

In the optical coupling system according to the embodiment of the present invention, a layer configuration of the liquid crystal diffraction element is not limited to the configurations illustrated in FIGS. 2 and 3.

For example, the liquid crystal diffraction element may be composed of the alignment film 24 and the optically anisotropic layer 26 by stripping the support 20 from the liquid crystal diffraction element 104 illustrated in FIGS. 2 and 3. Alternatively, the liquid crystal diffraction element may be composed of only the optically anisotropic layer 26 by stripping the support 20 and the alignment film 24 from the liquid crystal diffraction element 104 illustrated in FIGS. 2 and 3. Furthermore, in these aspects, a sheet-shaped object such as another substrate may be bonded to the optically anisotropic layer 26.

That is, in the transmissive type liquid crystal diffraction element including the optically anisotropic layer used in the optical coupling system according to the embodiment of the present invention, any of various layer configurations including the optically anisotropic layer having the liquid crystal alignment pattern in which the directions of the optical axes derived from the liquid crystal compounds change while continuously rotating in at least one direction in plane can be used.

Hereinafter, constituents of the liquid crystal diffraction element 104 will be described.
(Support)

In the liquid crystal diffraction element 104, the support 20 supports the alignment film 24 and the optically anisotropic layer 26.

Any of various sheet-shaped objects (films and plate-shaped objects) that can support the alignment film 24 and the optically anisotropic layer 26 can be used as the support 20.

A transparent support is preferably used as the support 20. Examples of the support 20 include a polyacrylic-based resin film such as polymethyl methacrylate, a cellulose-based resin film such as cellulose triacetate, a cycloolefin polymer-based film (for example, product name "Arton" manufactured by JSR Corporation or product name "Zeonor" manufactured by Zeon Corporation), polyethylene terephthalate (PET), polycarbonate, and polyvinyl chloride. The support is not limited to a flexible film and may be a non-flexible substrate such as a glass substrate.

A thickness of the support 20 is not limited and may be appropriately set to a thickness with which the alignment film and the optically anisotropic layer can be held in accordance with a purpose of the liquid crystal diffraction element 104 and a forming material and the like of the support 20.

The thickness of the support 20 is preferably 1 to 1000 µm, more preferably 3 to 250 µm, and still more preferably 5 to 150 µm.
(Alignment Film)

In the liquid crystal diffraction element 104, the alignment film 24 is formed on a surface of the support 20.

The alignment film 24 is an alignment film for aligning the liquid crystal compounds 30 in a predetermined liquid crystal alignment pattern in forming the optically anisotropic layer 26 of the liquid crystal diffraction element 104.

FIG. 3 and the like illustrate rod-like liquid crystal compounds as the liquid crystal compounds 30.

As described above, in the transmissive type liquid crystal diffraction element 104 in the illustrated example, the optically anisotropic layer 26 has the liquid crystal alignment pattern in which directions of optical axes 30A (refer to FIG. 4) derived from the liquid crystal compounds 30 change while continuously rotating along one direction (a direction of arrow A in FIG. 4) in plane.

Accordingly, the alignment film of the liquid crystal diffraction element 104 is formed such that the optically anisotropic layer 26 can form this liquid crystal alignment pattern.

In the present invention, in a case where the liquid crystal compounds 30 are rod-like liquid crystal compounds, the optical axes 30A of the liquid crystal compounds 30 are intended to be molecular major axes of the rod-like liquid crystal compounds. Meanwhile, in a case where the liquid crystal compounds 30 are disk-like liquid crystal compounds, the optical axes 30A of the liquid crystal compounds 30 are intended to be axes parallel to a direction orthogonal to disc planes of the disk-like liquid crystal compounds.

In the following description, "rotation of the directions of the optical axes 30A" will be simply referred to as "rotation of the optical axes 30A".

Various well-known types of the alignment film can be used.

Examples of the alignment film include a rubbing treatment film consisting of an organic compound such as a polymer, an oblique vapor deposition film of an inorganic compound, a film having a microgroove, and a film obtained by accumulating a Langmuir-Blodgett (LB) film of an organic compound such as ω-tricosanoic acid, methyldioctadecylammonium chloride, and methyl stearate using the Langmuir-Blodgett method.

The alignment film obtained using the rubbing treatment can be formed by rubbing a surface of a polymer layer several times with paper or cloth in a certain direction.

Preferable examples of a material used in the alignment film include polyimide, polyvinyl alcohol, a polymer having a polymerizable group according to JP1997-152509A (JP- H09-152509A), and a material used for forming an alignment film according to JP2005-97377A, JP2005-99228A, and JP2005-128503A.

In the liquid crystal diffraction element 104, a so-called photo-alignment film obtained by irradiating a material having photo-alignment properties with polarized light or non-polarized light to form an alignment film is suitably used as the alignment film. That is, in the liquid crystal diffraction element 104, a photo-alignment film formed by coating the support 20 with a photo-alignment material is suitably used as the alignment film 24.

Irradiation with the polarized light can be performed from a perpendicular direction or an oblique direction with respect to the photo-alignment film, and irradiation with the non-polarized light can be performed from an oblique direction with respect to the photo-alignment film.

Preferable examples of the photo-alignment material used in the photo-alignment film that can be used in the present invention include an azo compound according to JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, an aromatic ester compound according to JP2002-229039A, a maleimide and/or alkenyl-substituted nadimide compound having photo-alignment units according to JP2002-265541A and JP2002-317013A, a photocrosslinkable silane derivative according to JP4205195B and JP4205198B, photocrosslinkable polyimide, photocrosslinkable polyamide, and photocrosslinkable ester according to JP2003-520878A, JP2004-529220A, and JP4162850B, a photodimerizable compound, particularly a cinnamate compound, a chalcone compound, and a coumarin compound, according to JP1997-118717A (JP-H09-118717A), JP1998-506420A (JP-H10-506420A), JP2003-505561A, WO2010/150748A, JP2013-177561A, and JP2014-12823A.

Among the photo-alignment materials, the azo compound, the photocrosslinkable polyimide, the photocrosslinkable polyamide, the photocrosslinkable ester, the cinnamate compound, and the chalcone compound are suitably used.

A thickness of the alignment film is not limited and may be appropriately set to a thickness with which a required alignment function is obtained in accordance with the forming material of the alignment film.

The thickness of the alignment film is preferably 0.01 to 5 µm and more preferably 0.05 to 2 µm.

A method of forming the alignment film is not limited. Various well-known methods corresponding to the forming material of the alignment film can be used. Examples of the method include a method of forming the alignment pattern by coating the surface of the support 20 with the alignment film, drying the alignment film, and then exposing the alignment film to light using laser light.

Figure 7:
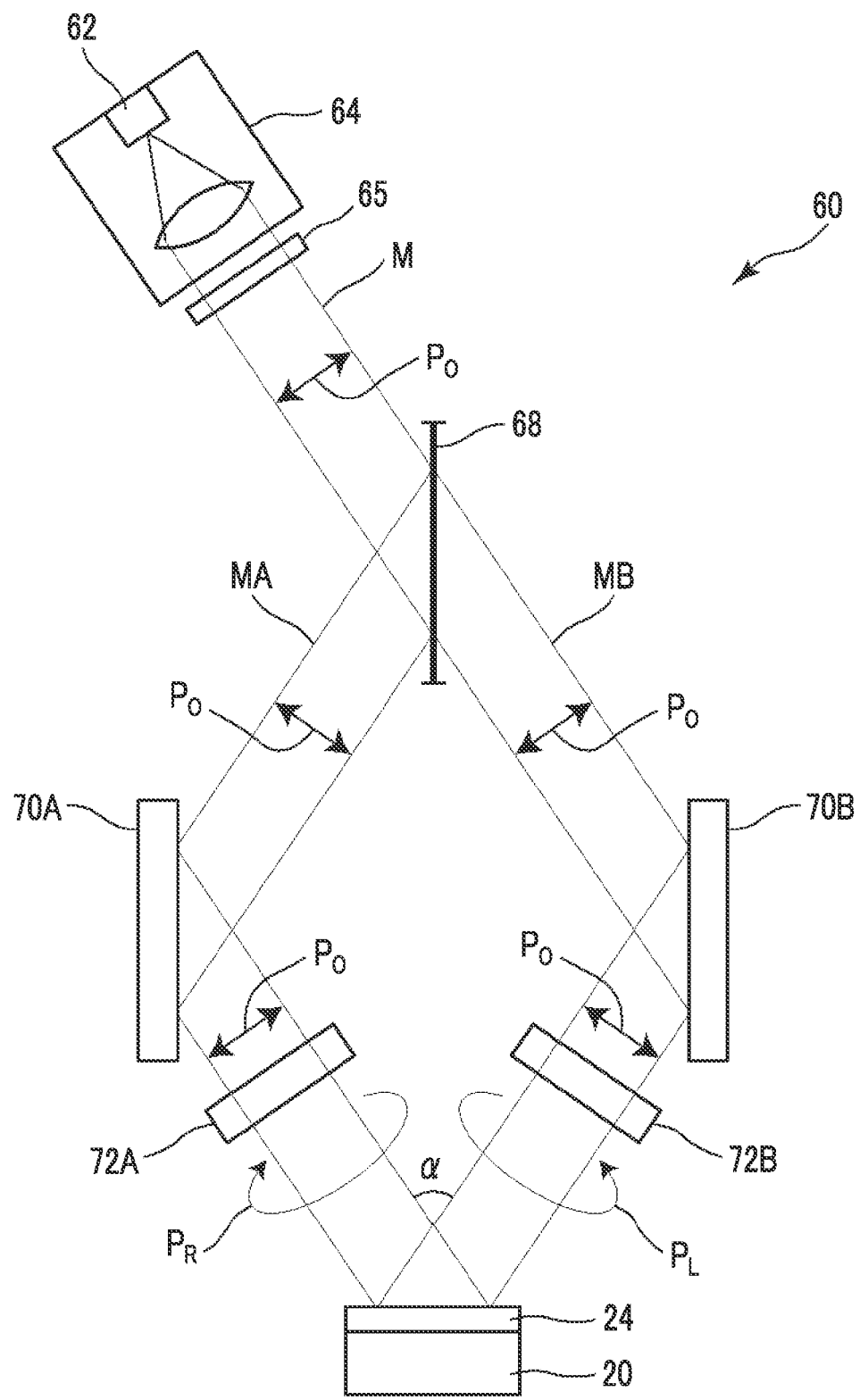
FIG. 7 is a conceptual diagram of an example of an exposure device that exposes an alignment film of the liquid crystal diffraction element illustrated in FIGS. 2 and 3 to light.

FIG. 7 conceptually illustrates an example of an exposure device that forms the above alignment pattern by exposing the alignment film 24 to light.

An exposure device 60 illustrated in FIG. 7 comprises a light source 64 comprising a laser 62, a λ/2 plate 65 that changes a polarization direction of laser light M emitted by the laser 62, a polarized light beam control element 68 that separates the laser light M emitted by the laser 62 into two rays MA and MB, mirrors 70A and 70B disposed on optical paths of the two separated rays MA and MB, respectively, and λ/4 plates 72A and 72B.

The light source 64 emits linearly polarized light $P_0$. The λ/4 plate 72A converts the linearly polarized light $P_0$ (ray MA) into dextrorotatory circularly polarized light $P_R$, and the λ/4 plate 72B converts the linearly polarized light $P_0$ (ray MB) into levorotatory circularly polarized light $P_L$.

The support 20 including the alignment film 24 before forming the alignment pattern is disposed on an exposed portion, and two of the ray MA and the ray MB are caused to intersect with each other on the alignment film 24 to interfere with each other. The alignment film 24 is exposed to light by irradiating the alignment film 24 with the light caused by the interference.

The interference here causes a polarization state of the light with which the alignment film 24 is irradiated to periodically change in the shape of interference fringes. Accordingly, the alignment film having the alignment pattern in which the alignment states periodically change is obtained. In the following description, the alignment film having the alignment pattern will be referred to as a "patterned alignment film".

In the exposure device 60, a period of the alignment pattern can be adjusted by changing an intersecting angle α between the two rays MA and MB. That is, in the exposure device 60, a length of one period (one period Λ described later) in which the optical axes 30A rotate by 180° in one direction in which the optical axes 30A rotate in the alignment pattern in which the optical axes 30A derived from the liquid crystal compounds 30 continuously rotate along one direction can be adjusted by adjusting the intersecting angle α.

The optically anisotropic layer 26 having the liquid crystal alignment pattern in which the optical axes 30A derived from the liquid crystal compounds 30 continuously rotate along one direction can be formed by forming the optically anisotropic layer 26 on the alignment film 24 having the alignment pattern in which the alignment states periodically change.

In addition, rotation directions of the optical axes 30A can be reversed by rotating an optical axis of each of the λ/4 plates 72A and 72B by 90°.

As described above, the patterned alignment film has the alignment pattern in which the liquid crystal compound is aligned to have the liquid crystal alignment pattern in which the directions of the optical axes of the liquid crystal compounds of the optically anisotropic layer 26 formed on the patterned alignment film change while continuously rotating along at least one direction in plane.

In a case where an axis along a direction in which the liquid crystal compound is aligned in the patterned alignment film is referred to as an alignment axis, the patterned alignment film is said to have an alignment pattern in which a direction of the alignment axis changes while continuously rotating along at least one direction in plane.

The alignment axis of the patterned alignment film can be detected by measuring absorption anisotropy. For example, in a case where a light quantity of light transmitted through the patterned alignment film is measured by irradiating the patterned alignment film with linearly polarized light while rotating the patterned alignment film, a direction of the maximum or minimum light quantity is observed as gradually changing along one direction in plane.

In the liquid crystal diffraction element 104, the alignment film 24 is provided as a preferable aspect and is not an essential configuration requirement, as described above.

The optically anisotropic layer 26 or the like can also be configured to have the liquid crystal alignment pattern in which the directions of the optical axes 30A derived from the liquid crystal compounds 30 change while continuously rotating along one direction, by forming the alignment pattern on the support 20 using, for example, a method of performing the rubbing treatment on the support 20 or a method of processing the support 20 using laser light or the like.

(Optically Anisotropic Layer)

In the liquid crystal diffraction element 104 illustrated in FIGS. 2 and 3, the optically anisotropic layer 26 is formed on a surface of the alignment film 24.

As described above, in the liquid crystal diffraction element 104, the optically anisotropic layer 26 is formed using a composition including the liquid crystal compound.

In a case where a value of in-plane retardation is set to λ/2, the optically anisotropic layer 26 has a function as a general λ/2 plate, that is, a function of causing a phase difference of a half wavelength, that is, 180°, between two linearly polarized light components that are included in the light incident on the optically anisotropic layer and that are orthogonal to each other.

The optically anisotropic layer 26 has the liquid crystal alignment pattern in which the directions of the optical axes 30A derived from the liquid crystal compounds 30 change while continuously rotating in one direction (the direction of arrow A in FIG. 4 and the like) in the plane of the optically anisotropic layer.

The optical axes 30A derived from the liquid crystal compounds 30 are so-called slow axes that are axes of the highest refractive index in the liquid crystal compounds 30. For example, in a case where the liquid crystal compounds 30 are rod-like liquid crystal compounds, the optical axes 30A are along the major axis directions of the rod shapes.

In the following description, the optical axes 30A derived from the liquid crystal compounds 30 will be referred to as the "optical axes 30A of the liquid crystal compounds 30" or the "optical axes 30A".

Figure 4:
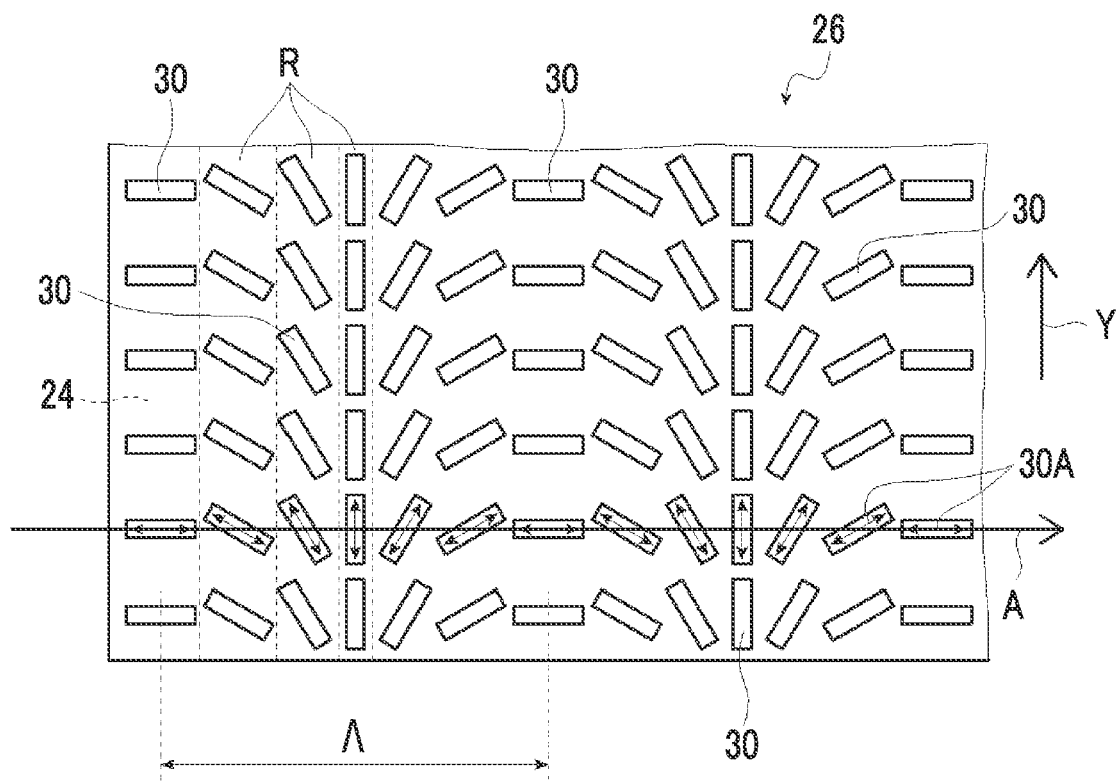
FIG. 4 is a conceptual diagram of a plane of the liquid crystal diffraction element illustrated in FIGS. 2 and 3.

FIG. 4 is a schematic diagram illustrating the alignment states of the liquid crystal compounds 30 in plane in a main surface of the optically anisotropic layer 26. A main surface is the largest surface of a sheet-shaped object (a film, a plate-shaped object, or a layer).

As described above, the optically anisotropic layer 26 has the liquid crystal alignment pattern in which the optical axes 30A change while continuously rotating in one direction indicated by arrow A in plane.

Figure 5:
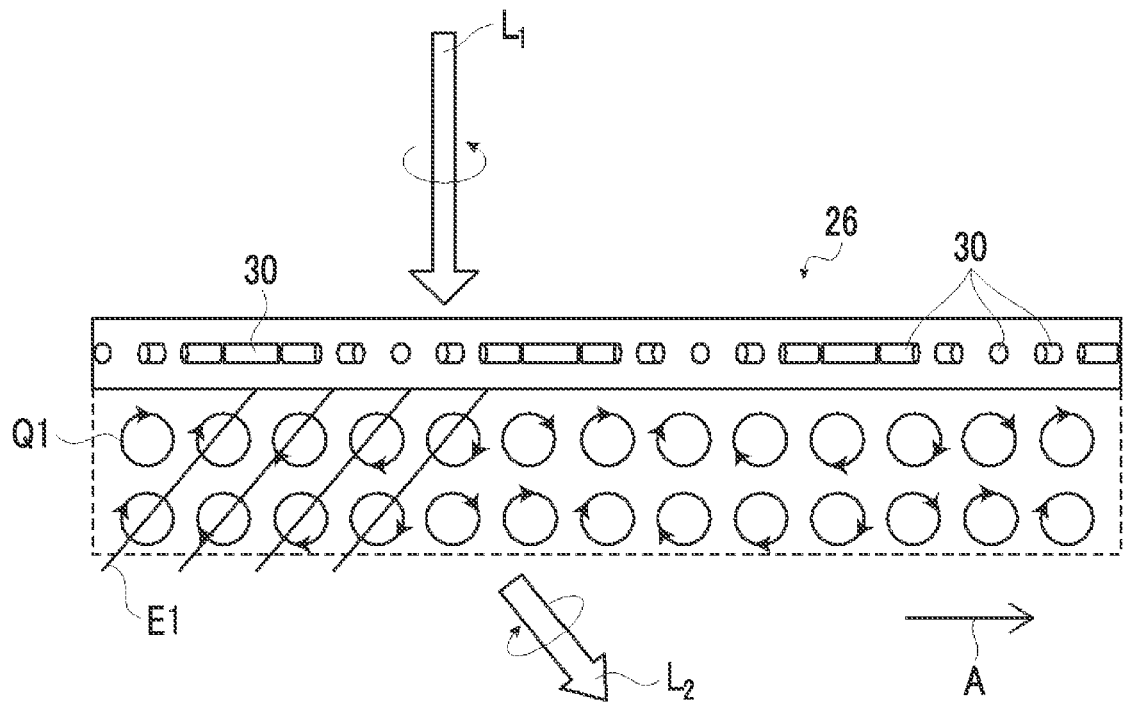
FIG. 5 is a conceptual diagram for describing an action of the liquid crystal diffraction element illustrated in FIGS. 2 and 3.
Figure 6:
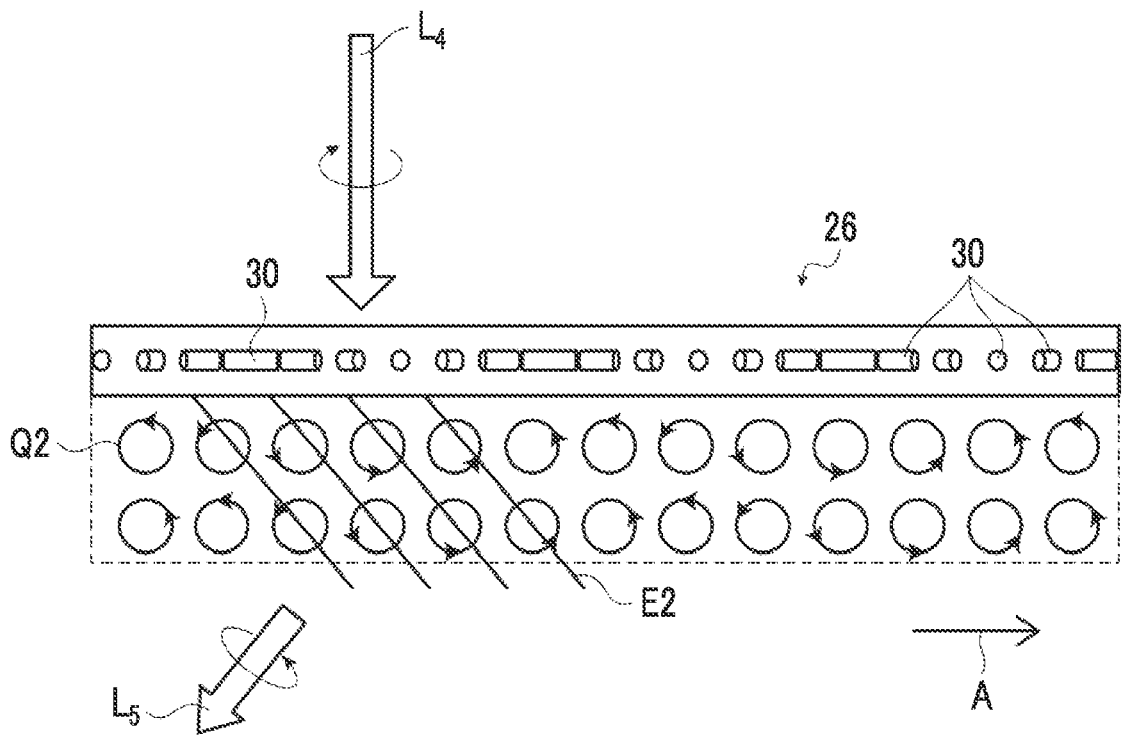
FIG. 6 is a conceptual diagram for describing an action of the liquid crystal diffraction element illustrated in FIGS. 2 and 3.

In the optically anisotropic layer 26, the liquid crystal compounds 30 are two-dimensionally aligned in a plane that is parallel to one direction indicated by arrow A and to a Y direction orthogonal to the direction of arrow A. In FIGS. 5 and 6 described later, the Y direction is a direction orthogonal to the page.

In the following description, "one direction indicated by arrow A" will be simply referred to as the "direction of arrow A".

A plan view is a view of the optically anisotropic layer 26 seen from the thickness direction (=a lamination direction of each layer (film)). In other words, a plan view is a view of the optically anisotropic layer 26 seen from a direction orthogonal to the main surface.

In addition, in FIG. 4, only the liquid crystal compounds 30 on the surface of the alignment film 24 are illustrated as the liquid crystal compounds 30 for clear illustration of a configuration of the liquid crystal diffraction element 104.

However, this optically anisotropic layer 26 also has a structure in which the liquid crystal compounds 30 are laminated from the liquid crystal compounds 30 on the surface of the alignment film in the thickness direction, as illustrated in FIGS. 2 and 3. This point also applies to FIGS. 5 and 6, described later. With respect to the thickness direction, the liquid crystal compounds 30 are laminated in the thickness direction in the optically anisotropic layer 26 illustrated in FIG. 2, and the liquid crystal compounds 30 are laminated in an oblique direction with respect to the thickness direction in the optically anisotropic layer 26 illustrated in FIG. 3.

The optically anisotropic layer 26 has the liquid crystal alignment pattern in which the directions of the optical axes 30A derived from the liquid crystal compounds 30 change while continuously rotating along the direction of arrow A in the plane of the optically anisotropic layer 26.

Changing of the directions of the optical axes 30A of the liquid crystal compounds 30 while continuously rotating in the direction of arrow A (one predetermined direction) specifically means that angles formed by the optical axes 30A of the liquid crystal compounds 30 arranged along the direction of arrow A and the direction of arrow A vary depending on a position in the direction of arrow A, and the angles formed by the optical axes 30A and the direction of arrow A sequentially change from θ to θ+180° or θ−180° along the direction of arrow A.

A difference in angle between the optical axes 30A of the liquid crystal compounds 30 adjacent to each other in the direction of arrow A is preferably less than or equal to 45°, more preferably less than or equal to 15°, and still more preferably an angle less than 15°.

Meanwhile, in the liquid crystal compounds 30 forming the optically anisotropic layer 26, the liquid crystal compounds 30 having equal directions of the optical axes 30A are arranged at equal intervals in the Y direction orthogonal to the direction of arrow A, that is, the Y direction orthogonal to one direction in which the optical axes 30A continuously rotate.

In other words, in the liquid crystal compounds 30 forming the optically anisotropic layer 26, the liquid crystal compounds 30 arranged in the Y direction have equal angles formed by the directions of the optical axes 30A and the direction of arrow A.

In the liquid crystal alignment pattern in which the optical axes 30A continuously rotate in one direction, a length (distance) in which the optical axes 30A of the liquid crystal compounds 30 rotate by 180° is set as the length Λ of one period in the liquid crystal alignment pattern.

That is, in the optically anisotropic layer 26 illustrated in FIGS. 2 to 4, the length (distance) in which the optical axes 30A of the liquid crystal compounds 30 rotate by 180° in the direction of arrow A in which the directions of the optical axes 30A change by continuously rotating in plane is set as the length Λ of one period in the liquid crystal alignment pattern. In other words, the length of one period in the liquid crystal alignment pattern is defined as a distance in which the angles formed by the optical axes 30A of the liquid crystal compounds 30 and the direction of arrow A change from θ to θ+180°.

That is, a distance between centers, in the direction of arrow A, of two liquid crystal compounds 30 having equal angles with respect to the direction of arrow A is set as the length Λ of one period. Specifically, as illustrated in FIG. 4, a distance between centers, in the direction of arrow A, of two liquid crystal compounds 30 of which the directions of the optical axes 30A match the direction of arrow A is set as the length Λ of one period.

In the following description, the length Λ of one period will be referred to as "one period Λ".

In the liquid crystal diffraction element 104, one period Λ is repeated in the direction of arrow A, that is, one direction in which the directions of the optical axes 30A change by continuously rotating, in the liquid crystal alignment pattern of the optically anisotropic layer 26. In addition, in the liquid crystal diffraction element 104 (optically anisotropic layer 26), one period Λ is a period (one period) of a diffraction structure.

As described above, in the optically anisotropic layer 26, the liquid crystal compounds arranged in the Y direction orthogonal to the direction of arrow A have equal angles formed by the optical axes 30A and the direction of arrow A, that is, one direction in which the directions of the optical axes of the liquid crystal compounds 30 rotate. A region in which the liquid crystal compounds 30 having equal angles formed by the optical axes 30A and the direction of arrow A are arranged in the Y direction will be referred to as a region R.

In this case, the value of in-plane retardation (Re) in each region R is preferably the half wavelength, that is, λ/2. The in-plane retardation is calculated as a product of a refractive index difference Δn caused by refractive index anisotropy of the regions R and a thickness of the optically anisotropic layer. Here, the refractive index difference caused by the refractive index anisotropy of the regions R in the optically anisotropic layer is a refractive index difference defined as a difference between a refractive index in a direction of the slow axis and a refractive index in a direction orthogonal to the direction of the slow axis in a plane of the regions R. That is, the refractive index difference Δn caused by the refractive index anisotropy of the regions R is equal to a difference between a refractive index of the liquid crystal compounds 30 in the directions of the optical axes 30A and a refractive index of the liquid crystal compounds 30 in a direction perpendicular to the optical axes 30A in the plane of the regions R. That is, the refractive index difference Δn is equal to a refractive index difference between the liquid crystal compounds.

In a case where circularly polarized light is incident on the optically anisotropic layer 26, the light is refracted (diffracted), and a direction of the circularly polarized light is converted.

This action is conceptually illustrated in FIGS. 5 and 6. It is assumed that a value of a product of the refractive index difference between the liquid crystal compounds and the thickness of the optically anisotropic layer is λ/2 in the optically anisotropic layer 26.

As illustrated in FIG. 5, in a case where the value of the product of the refractive index difference between the liquid crystal compounds of the optically anisotropic layer 26 and the thickness of the optically anisotropic layer is λ/2, and an incidence ray $L_1$ that is levorotatory circularly polarized light is incident on the optically anisotropic layer 26, the incidence ray $L_1$ is caused to have a phase difference of 180° by passing through the optically anisotropic layer 26, and a transmitted ray $L_2$ is converted into dextrorotatory circularly polarized light.

In addition, in passing through the optically anisotropic layer 26, an absolute phase of the incidence ray $L_1$ changes in accordance with the direction of the optical axis 30A of each liquid crystal compound 30. At this point, since the directions of the optical axes 30A change while rotating along the direction of arrow A, an amount of change in the absolute phase of the incidence ray $L_1$ varies depending on the directions of the optical axes 30A. Furthermore, since the liquid crystal alignment pattern formed in the optically anisotropic layer 26 is a periodic pattern in the direction of arrow A, the incidence ray $L_1$ that has passed through the optically anisotropic layer 26 is caused to have a periodic absolute phase Q1 in the direction of arrow A corresponding to the direction of each optical axis 30A, as illustrated in FIG. 5. Accordingly, an equiphase plane E1 that is inclined in a direction opposite to the direction of arrow A is formed.

Thus, the transmitted ray $L_2$ is refracted to be inclined in a direction perpendicular to the equiphase plane E1 and travels in a direction different from a traveling direction of the incidence ray $L_1$. Accordingly, the incidence ray $L_1$ which is the levorotatory circularly polarized light is converted into the transmitted ray $L_2$ which is the dextrorotatory circularly polarized light inclined by a certain angle to the direction of arrow A with respect to an incidence direction.

Meanwhile, as conceptually illustrated in FIG. 6, in a case where the value of the product of the refractive index difference between the liquid crystal compounds of the optically anisotropic layer 26 and the thickness of the optically anisotropic layer is λ/2, and an incidence ray $L_4$ that is dextrorotatory circularly polarized light is incident on the optically anisotropic layer 26, the incidence ray $L_4$ is caused to have a phase difference of 180° by passing through the optically anisotropic layer 26 and is converted into a transmitted ray $L_5$ that is levorotatory circularly polarized light.

In addition, in passing through the optically anisotropic layer 26, an absolute phase of the incidence ray $L_4$ changes in accordance with the direction of optical axis 30A of each liquid crystal compound 30. At this point, since the directions of the optical axes 30A change while rotating along the direction of arrow A, an amount of change in the absolute phase of the incidence ray $L_4$ varies depending on the directions of the optical axes 30A. Furthermore, since the liquid crystal alignment pattern formed in the optically anisotropic layer 26 is a periodic pattern in the direction of arrow A, the incidence ray $L_4$ that has passed through the optically anisotropic layer 26 is caused to have a periodic absolute phase Q2 in the direction of arrow A corresponding to the direction of each optical axis 30A, as illustrated in FIG. 6.

Here, since the incidence ray $L_4$ is the dextrorotatory circularly polarized light, the periodic absolute phase Q2 in the direction of arrow A corresponding to the directions of the optical axes 30A is opposite to that of the incidence ray $L_1$ which is the levorotatory circularly polarized light. Consequently, an equiphase plane E2 that is inclined to the direction of arrow A opposite to that of the incidence ray $L_1$ is formed in the incidence ray $L_4$.

Thus, the transmitted ray $L_5$ is refracted to be inclined in a direction perpendicular to the equiphase plane E2 and travels in a direction different from a traveling direction of the incidence ray $L_4$. Accordingly, the incidence ray $L_4$ is converted into the transmitted ray $L_5$ which is the levorotatory circularly polarized light inclined by a certain angle to the direction opposite to the direction of arrow A with respect to the incidence direction.

As described above, the liquid crystal diffraction element comprising the optically anisotropic layer having the liquid crystal alignment pattern is suitably used as the polarized light beam control element 14 and the polarization-selective diffraction element 17 in the optical coupling system according to the embodiment of the present invention.

For example, in the optical coupling system 1 illustrated in FIG. 1, it is assumed that the luminous flux emitted from the core 11a of the multi-core fiber 10 is unpolarized light.

In this case, in a case where the luminous flux 13a is incident on the polarized light beam control element 14 which is the above liquid crystal diffraction element, the luminous flux 13a is separated into two of the luminous flux 15a and the luminous flux 16a which are a dextrorotatory circularly polarized light component and a levorotatory circularly polarized light component, by the action of the optically anisotropic layer 26. In addition, the luminous flux 15a and the luminous flux 16a which are separated travel separately in different directions from each other, which are the direction of arrow A and the direction opposite to the direction of arrow A.

Furthermore, in the optical coupling system 1, in a case where two of the luminous flux 15a and the luminous flux 16a separated by the polarized light beam control element 14 are incident on the polarization-selective diffraction element 17 which is the above liquid crystal diffraction element, the luminous fluxes 15a and 16a are subjected to the optical path control in accordance with their respective polarization states by the action of the optically anisotropic layer 26 and can be coupled to the light incident and emission surfaces 19 of the coupled devices 18.

The luminous flux 15a and the luminous flux 16a derived from the same core 11a may be subjected to the optical path control to be coupled to the same coupled device, as necessary.

In the optically anisotropic layer 26, while the values of the in-plane retardation of the plurality of regions R are preferably the half wavelength, the in-plane retardation $Re(550)=\Delta n_{550} \times d$ of the plurality of regions R of the optically anisotropic layer 26 with respect to the incidence ray having a wavelength of 550 nm is preferably within a range defined in Expression (1) below. Here, $\Delta n_{550}$ is the refractive index difference caused by the refractive index anisotropy of the regions R in a case where the wavelength of the incidence ray is 550 nm, and d is the thickness of the optically anisotropic layer 26.

$$200 \text{ nm} \leq \Delta n_{550} \times d \leq 350 \text{ nm} \tag{1}$$

The optically anisotropic layer 26 functions as a so-called λ/2 plate. However, the present invention includes an aspect in which a laminate comprising the support 20 and the alignment film 24 as a single body functions as a λ/2 plate in a case where the support 20 and the alignment film 24 are provided.

The optically anisotropic layer 26 can adjust refraction angles of the transmitted rays $L_2$ and $L_5$ by changing one period Λ of the formed liquid crystal alignment pattern. Specifically, as one period Λ of the liquid crystal alignment pattern is decreased, rays that have passed through the liquid crystal compounds 30 adjacent to each other strongly interfere with each other. Thus, the transmitted rays $L_2$ and $L_5$ can be significantly refracted.

For example, in a case where light is incident on the optically anisotropic layer 26 from a normal direction, an angle formed by the normal direction and the transmitted ray is increased as one period Λ is shortened. The normal direction is a direction orthogonal to a surface and is a direction orthogonal to the main surface of the optically anisotropic layer 26.

Furthermore, a refraction direction of the transmitted ray can be set to its opposite direction by setting the rotation directions of the optical axes 30A of the liquid crystal compounds 30 that rotate along the direction of arrow A to their opposite directions.

The optically anisotropic layer 26 is formed using the liquid crystal composition including the rod-like liquid crystal compounds or the disk-like liquid crystal compounds and has the liquid crystal alignment pattern in which the optical axes of the rod-like liquid crystal compounds or the optical axes of the disk-like liquid crystal compounds are aligned as described above.

The optically anisotropic layer consisting of a cured layer of the liquid crystal composition can be obtained by forming the alignment film 24 having the alignment pattern corresponding to the above liquid crystal alignment pattern on the support 20, coating the alignment film 24 with the liquid crystal composition, and curing the liquid crystal composition.

The liquid crystal composition for forming the optically anisotropic layer 26 contains the rod-like liquid crystal compounds or the disk-like liquid crystal compounds and may further contain other components such as a leveling agent, an alignment control agent, a surfactant, a polymerization initiator, a crosslinking agent, and an alignment assistant.

The optically anisotropic layer 26 desirably has a wide bandwidth with respect to the wavelength of the incidence ray and is preferably configured using a liquid crystal material having anomalous dispersion of a birefringence index.

In addition, it is also preferable that the optically anisotropic layer has a substantially wide bandwidth with respect to the wavelength of the incidence ray by further laminating a plurality of layers of optically anisotropic layers having opposite twisted directions in the thickness direction, by causing the liquid crystal composition to have twisted components to align the liquid crystal compounds in a twisted manner in the thickness direction. For example, a method of implementing a patterned λ/2 plate having a wide bandwidth by laminating two layers of liquid crystals having different twisted directions in the optically anisotropic layer 26 is shown in JP2014-089476A and the like and can be preferably used in the present invention.

Rod-Like Liquid Crystal Compound

Azomethine compounds, azoxy compounds, cyanobiphenyl compounds, cyanophenyl ester compounds, benzoic acid ester compounds, cyclohexanecarboxylic acid phenyl ester compounds, cyanophenylcyclohexane compounds, cyano-substituted phenylpyrimidine compounds, alkoxy-substituted phenylpyrimidine compounds, phenyldioxane compounds, tolan compounds, and alkenylcyclohexylbenzonitrile compounds are preferably used as the rod-like liquid crystal compounds. Not only the above low molecular weight liquid crystal molecules but also high molecular weight liquid crystal molecules can be used.

In the optically anisotropic layer 26, it is more preferable to fix the alignment of the rod-like liquid crystal compounds through polymerization. Compounds according to Makromol. Chem., vol. 190, page 2255 (1989), Advanced Materials vol. 5, page 107 (1993), U.S. Pat. Nos. 4,683,327, 5,622,648, 5,770,107, WO95/22586A, WO95/24455A, WO97/00600A, WO98/23580A, WO98/52905, JP1989-272551A (JP-H01-272551A), JP1994-16616A (JP-H06-16616A), JP1995-110469A (JP-H07-110469A), JP1999-80081A (JP-H11-80081A), JP2001-64627, and the like can be used as polymerizable rod-like liquid crystal compounds. Furthermore, for example, rod-like liquid crystal compounds according to JP1999-513019A (JP-H11-513019A) and JP2007-279688A can also be preferably used.

Disk-Like Liquid Crystal Compound

For example, disk-like liquid crystal compounds according to JP2007-108732A and JP2010-244038A can be preferably used.

In a case where the disk-like liquid crystal compounds are used in the optically anisotropic layer, the liquid crystal compounds 30 stand in the thickness direction in the optically anisotropic layer, and the optical axes 30A derived from the liquid crystal compounds are defined as so-called fast axes that are axes perpendicular to the disc planes.

Any of the above optically anisotropic layers 26 has the liquid crystal alignment pattern in which the optical axes 30A of the liquid crystal compounds 30 continuously rotate in one direction (the direction of arrow A) in plane.

Meanwhile, the liquid crystal diffraction element that causes each spatially divided signal light (beam) to condense or diffuse (diverge) can be produced by precisely designing the alignment of the liquid crystal compounds in the liquid crystal diffraction element.

Figure 8:
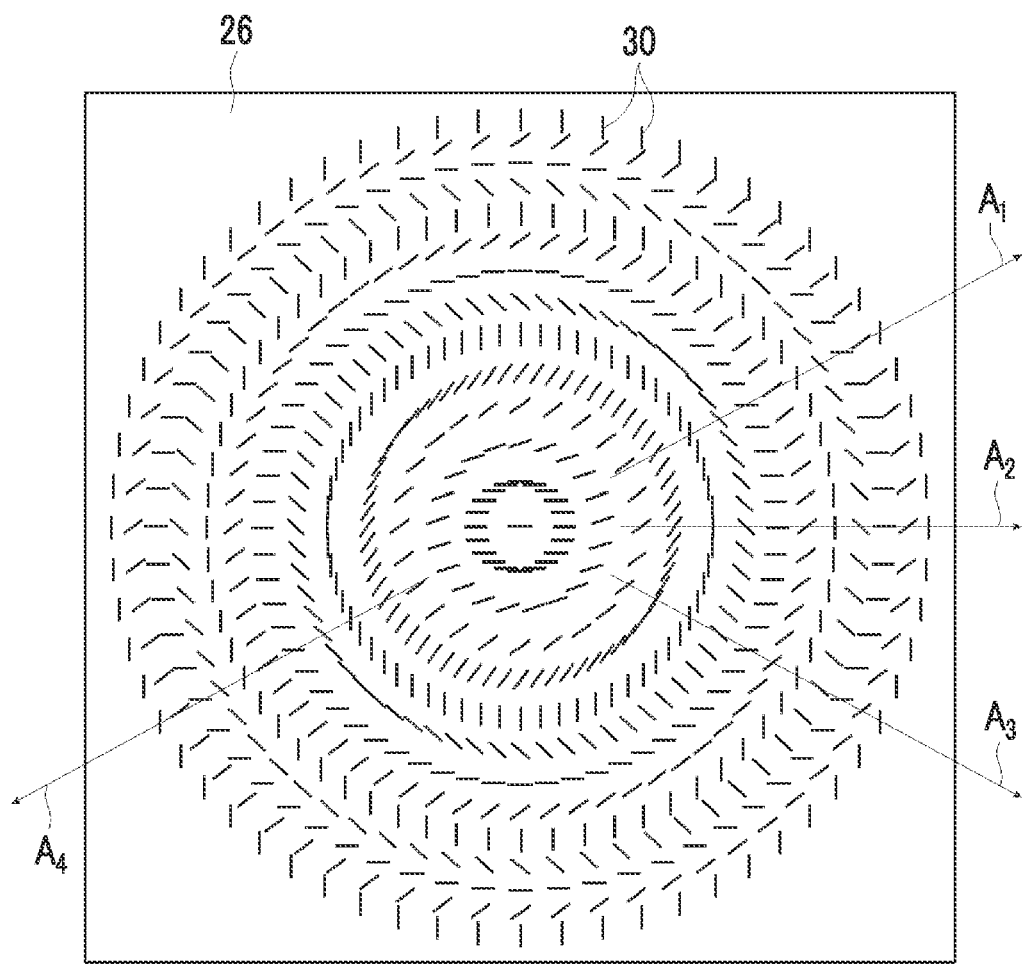
FIG. 8 is a conceptual diagram of another example of the liquid crystal diffraction element used in the optical coupling system according to the embodiment of the present invention.

FIG. 8 conceptually illustrates an example of the liquid crystal diffraction element.

In FIG. 8, in the optically anisotropic layer 26, the directions of the optical axes of the liquid crystal compounds 30 change while continuously rotating along multiple directions from a center of the optically anisotropic layer 26 toward an outside, for example, a direction indicated by arrow $A_1$, a direction indicated by arrow $A_2$, a direction indicated by arrow $A_3$, a direction indicated by arrow $A_4$, . . . .

Accordingly, in the optically anisotropic layer 26, the rotation directions of the optical axes of the liquid crystal compounds 30 are the same directions in all directions (one direction). In the illustrated example, the rotation directions of the optical axes of the liquid crystal compounds 30 are counterclockwise in all directions of the direction indicated by arrow $A_1$, the direction indicated by arrow $A_2$, the direction indicated by arrow $A_3$, and the direction indicated by arrow $A_4$.

That is, in a case where arrow $A_1$ and arrow $A_4$ are regarded as one straight line, the rotation directions of the optical axes of the liquid crystal compounds 30 are reversed at the center of the optically anisotropic layer 26 on the straight line. For example, it is assumed that the straight line formed by arrow $A_1$ and arrow $A_4$ is directed in a right direction (the direction of arrow $A_1$) in FIG. 8. In this case, the optical axes of the liquid crystal compounds 30 first rotate clockwise from an outward direction to the center of the optically anisotropic layer 26. The rotation directions are reversed at the center of the optically anisotropic layer 26. Then, the optical axes of the liquid crystal compounds 30 rotate counterclockwise from the center to the outward direction of the optically anisotropic layer 26.

As described above, the optically anisotropic layer 26 having the liquid crystal alignment pattern in which the optical axes of the liquid crystal compounds 30 continuously rotate in one direction refracts the incident circularly polarized light to its opposite direction in accordance with a revolution direction of the circularly polarized light.

In addition, in the optically anisotropic layer (liquid crystal diffraction element) having the liquid crystal alignment pattern in which the directions of the optical axes of the liquid crystal compounds 30 change while continuously rotating in one direction, a refraction direction of transmitted light depends on the rotation directions of the optical axes of the liquid crystal compounds 30. That is, in the liquid crystal alignment pattern, in a case where the rotation directions of the optical axes of the liquid crystal compounds 30 are reversed, the refraction direction of the transmitted light changes to a direction opposite to one direction in which the optical axes rotate.

Furthermore, a diffraction angle of the optically anisotropic layer 26 is increased as one period Λ is decreased. That is, refraction of light by the optically anisotropic layer 26 is increased as one period Λ is decreased.

Accordingly, the optically anisotropic layer 26 having such a concentric liquid crystal alignment pattern, that is, the liquid crystal alignment pattern in which the optical axes radially change while continuously rotating, can cause a plurality of incidence rays (light beams) to converge or diffuse and be transmitted through the optically anisotropic layer 26 in accordance with the rotation directions of the optical axes of the liquid crystal compounds 30 and a rotation direction of the incident circularly polarized light.

The optically anisotropic layer 26 having the concentric liquid crystal alignment pattern illustrated in FIG. 8 can also be used as the polarized light beam control element 14 and the polarization-selective diffraction element 17 constituting the optical coupling system according to the embodiment of the present invention.

An example of a case where the liquid crystal diffraction element comprising the optically anisotropic layer 26 having the concentric liquid crystal alignment pattern is used as the polarized light beam control element 14 and the polarization-selective diffraction element 17 of the optical coupling system 1 illustrated in FIG. 1 will be described.

In the present example, for example, it is assumed that in the optically anisotropic layer 26 having the concentric liquid crystal alignment pattern constituting the liquid crystal diffraction element as the polarized light beam control element 14 and the polarization-selective diffraction element 17, all of the rotation directions of the optical axes of the liquid crystal compounds 30 from the center to the outward direction (the direction of arrow $A_1$, the direction of arrow $A_2$, . . . , the direction of arrow $A_n$) are clockwise (opposite to FIG. 8).

As in FIGS. 4 to 6, in a case where the rotation directions of the optical axes of the liquid crystal compounds 30 in the direction of arrow A are clockwise, the optically anisotropic layer 26 refracts (diffracts) the levorotatory circularly polarized light (incidence ray $L_1$) in the direction of arrow A to be converted into the dextrorotatory circularly polarized light (transmitted ray $L_2$), as illustrated in FIG. 5. In addition, as illustrated in FIG. 6, the dextrorotatory circularly polarized light (incidence ray $L_4$) is refracted in the direction opposite to the direction of arrow A to be converted into the levorotatory circularly polarized light (transmitted ray $L_5$).

Accordingly, the optically anisotropic layer 26 (liquid crystal diffraction element) having the concentric liquid crystal alignment pattern converts the levorotatory circularly polarized light into the dextrorotatory circularly polarized light to be refracted in a diffusing (diverging) direction and converts the dextrorotatory circularly polarized light into the levorotatory circularly polarized light to be refracted in a condensing direction.

Here, in a case where the luminous fluxes emitted from the cores of the multi-core fiber 10 are unpolarized light, and the luminous flux 13a emitted from the core 11a is incident on the polarized light beam control element 14, the luminous flux 13a is separated into two luminous fluxes traveling in different directions. Specifically, as illustrated in FIG. 1, a dextrorotatory circularly polarized light component of the luminous flux 13a is converted into the levorotatory circularly polarized light (first polarization state) to travel in the condensing direction as the luminous flux 15a, and a levorotatory circularly polarized light component of the luminous flux 13a is converted into the dextrorotatory circularly polarized light (second polarization state) to travel in the diffusing direction as the luminous flux 16a.

Similarly, in a case where the luminous flux 13b of unpolarized light emitted from the core 11b is incident on the polarized light beam control element 14, the luminous flux 13b is separated into two luminous fluxes traveling in different directions. Specifically, as illustrated in FIG. 1, a dextrorotatory circularly polarized light component of the luminous flux 13b is converted into the levorotatory circularly polarized light to travel in the condensing direction as the luminous flux 15b, and a levorotatory circularly polarized light component of the luminous flux 13b is converted into the dextrorotatory circularly polarized light to travel in the diffusing direction as the luminous flux 16b.

The luminous flux 15a of the levorotatory circularly polarized light and the luminous flux 16a of the dextrorotatory circularly polarized light separated from the luminous flux 13a and the luminous flux 15b of the levorotatory circularly polarized light and the luminous flux 16b of the dextrorotatory circularly polarized light separated from the luminous flux 13b are then incident on the polarization-selective diffraction element 17, and the optical paths thereof are changed.

The luminous flux 15a of the levorotatory circularly polarized light is incident on the polarization-selective diffraction element 17 to be converted into the dextrorotatory circularly polarized light, and the optical path of the luminous flux 15a is changed to the diffusing direction. The luminous flux converted from the luminous flux 15a is coupled to the coupled device 18b.

The luminous flux 16a of the dextrorotatory circularly polarized light is incident on the polarization-selective diffraction element 17 to be converted into the levorotatory circularly polarized light, and the optical path of the luminous flux 16a is changed to the condensing direction. The luminous flux converted from the luminous flux 16a is coupled to the coupled device 18a.

The luminous flux 15b of the levorotatory circularly polarized light is incident on the polarization-selective diffraction element 17 to be converted into the dextrorotatory circularly polarized light, and the optical path of the luminous flux 15b is changed to the diffusing direction. The luminous flux converted from the luminous flux 15b is coupled to the coupled device 18c.

Furthermore, the luminous flux 16b of the dextrorotatory circularly polarized light is incident on the polarization-selective diffraction element 17 to be converted into the levorotatory circularly polarized light, and the optical path of the luminous flux 16b is changed to the condensing direction. The luminous flux converted from the luminous flux 16b is coupled to the coupled device 18d.

As described above, the diffraction angle of the optically anisotropic layer 26 changes in accordance with one period $\Lambda$ and is increased as one period $\Lambda$ is decreased.

Accordingly, by appropriately setting one period of the optically anisotropic layer 26 in the liquid crystal diffraction element constituting the polarized light beam control element 14, traveling directions of the luminous flux 15a and the luminous flux 16a obtained by separating the luminous flux 13a and traveling directions of the luminous flux 15b and the luminous flux 16b obtained by separating the luminous flux 13b can be adjusted to any directions.

In addition, by appropriately setting one period of the optically anisotropic layer 26 in the liquid crystal diffraction element constituting the polarization-selective diffraction element 17, the optical path of the luminous flux transmitted through the polarization-selective diffraction element 17 can be adjusted to any optical path in accordance with positions of the coupled devices 18. For example, as illustrated in FIG. 1, the optical paths of the four luminous fluxes can be set to be parallel to each other by appropriately adjusting one period of the optically anisotropic layer 26 in accordance with an incidence angle of each luminous flux.

Figure 9:
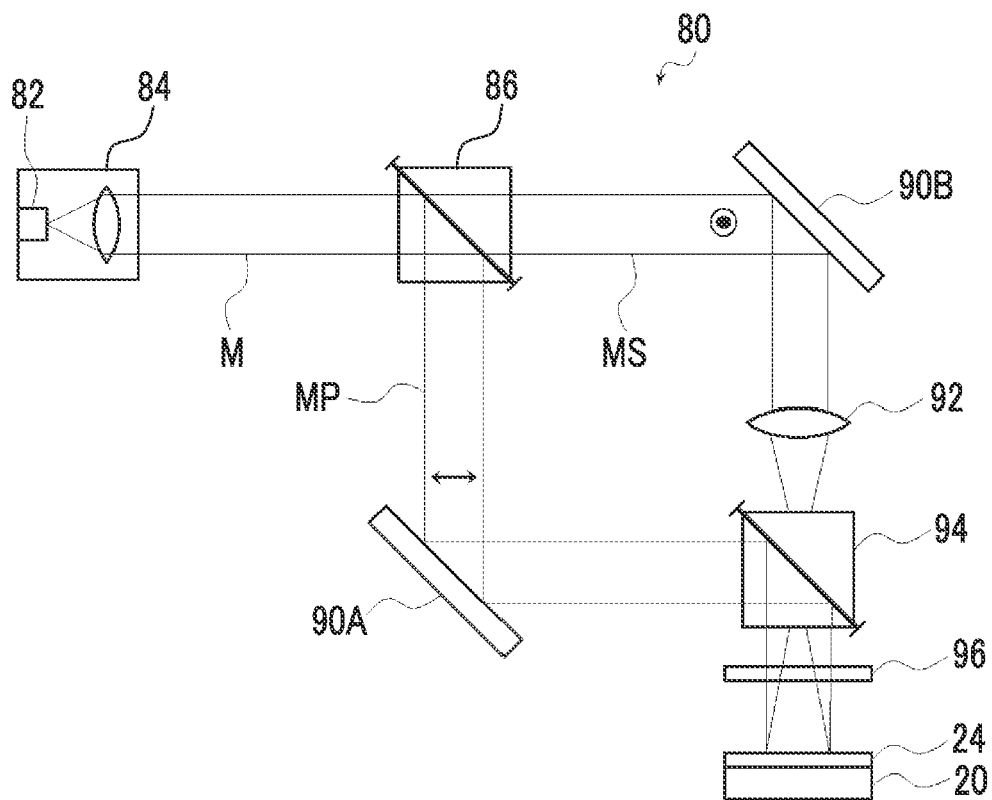
FIG. 9 is a conceptual diagram of an example of an exposure device that exposes an alignment film of the liquid crystal diffraction element illustrated in FIG. 8.

FIG. 9 conceptually illustrates an example of an exposure device that exposes the alignment film 24 to light to form the alignment pattern corresponding to the concentric liquid crystal alignment pattern, illustrated in FIG. 8, in which the optical axes radially change by continuously rotating.

An exposure device 80 illustrated in FIG. 9 includes a light source 84 comprising a laser 82, a polarized light beam control element 86 that divides the laser light M from the laser 82 into S polarized light MS and P polarized light MP, a mirror 90A disposed on an optical path of the P polarized light MP and a mirror 90B disposed on an optical path of the S polarized light MS, a lens 92 disposed on the optical path of the S polarized light MS, a polarized light beam control element 94, and a λ/4 plate 96.

The P polarized light MP divided by the polarized light beam control element 86 is reflected by the mirror 90A to be incident on the polarized light beam control element 94. Meanwhile, the S polarized light MS divided by the polarized light beam control element 86 is reflected by the mirror 90B and is condensed by the lens 92 to be incident on the polarized light beam control element 94.

The P polarized light MP and the S polarized light MS are multiplexed by the polarized light beam control element 94 and changed into the dextrorotatory circularly polarized light and the levorotatory circularly polarized light corresponding to their polarization directions by the λ/4 plate 96 and are incident on the alignment film 24 on the support 20.

Here, interference between the dextrorotatory circularly polarized light and the levorotatory circularly polarized light causes the polarization state of the light with which the alignment film 24 is irradiated to periodically change in the shape of interference fringes. Since an intersecting angle between the levorotatory circularly polarized light and the dextrorotatory circularly polarized light changes from an inside toward an outside of concentric circles, an exposure pattern in which pitches change from the inside toward the outside is obtained. Accordingly, a radial (concentric) alignment pattern in which the alignment states periodically change is obtained in the alignment film 24.

In the exposure device 80, one period of the liquid crystal alignment pattern in which the optical axes of the liquid crystal compounds 30 continuously rotate by 180° along one direction can be controlled by changing optical power of the lens 92 (an F-number of the lens 92), a focal length of the lens 92, a distance between the lens 92 and the alignment film 24, and the like.

In addition, by adjusting the optical power of the lens 92 (the F-number of the lens 92), a length of one period of the liquid crystal alignment pattern can be changed in one direction in which the optical axes continuously rotate.

Specifically, the length of one period of the liquid crystal alignment pattern can be changed in one direction in which the optical axes continuously rotate, using a spread angle of light that is spread by the lens 92 to interfere with parallel light. More specifically, in a case where the optical power of the lens 92 is decreased, the light becomes close to the parallel light. Thus, the length $\Lambda$ of one period of the liquid crystal alignment pattern is gradually decreased from the inside toward the outside, and the F-number is increased. Conversely, in a case where the optical power of the lens 92 is increased, the length $\Lambda$ of one period of the liquid crystal alignment pattern is rapidly decreased from the inside toward the outside, and the F-number is decreased.

Figure 10:
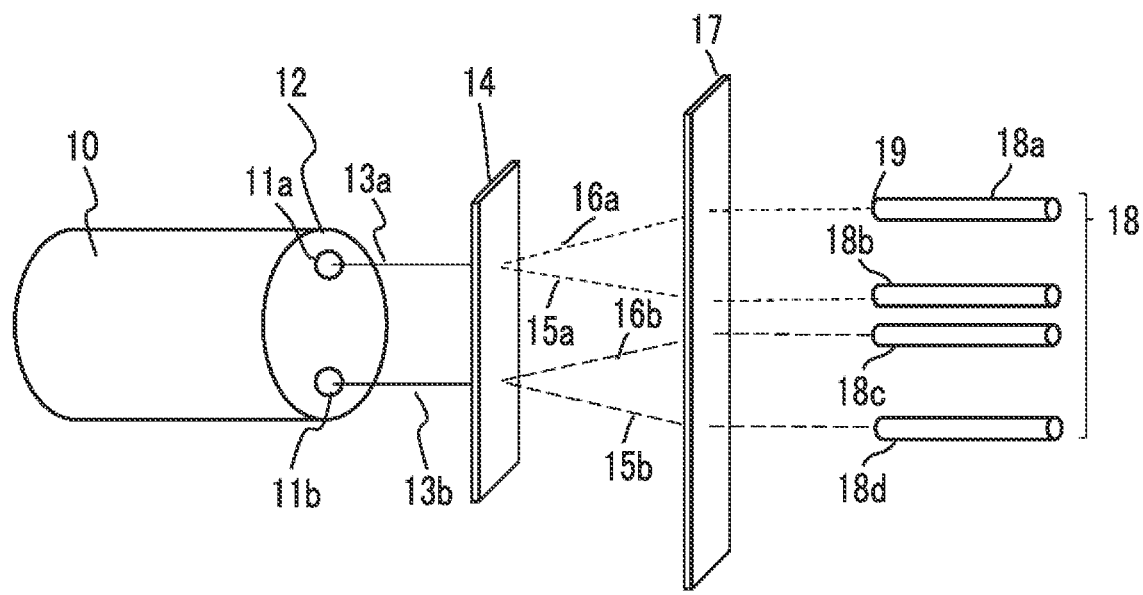
FIG. 10 is a conceptual diagram of another example of the optical coupling system according to the embodiment of the present invention.

FIG. 10 illustrates an example in which the liquid crystal diffraction element including the optically anisotropic layer 26 having the liquid crystal alignment pattern in which the directions of the optical axes derived from the liquid crystal compounds change while continuously rotating in one direction (the direction of arrow A) as illustrated in FIG. 4 is used as the polarized light beam control element 14 and the polarization-selective diffraction element 17 in the optical coupling system according to the embodiment of the present invention.

In the present example, for example, it is assumed that the direction of arrow A in FIGS. 4 to 6 of the optically anisotropic layer 26 constituting the polarized light beam control element 14 and the polarization-selective diffraction element 17 is an upward direction in FIG. 10. In addition, the liquid crystal compounds 30 rotate clockwise in the direction of arrow A.

As illustrated in FIGS. 5 and 6, the optically anisotropic layer 26 diffracts (refracts) the levorotatory circularly polarized light in the direction of arrow A (the upward direction in FIG. 10) to be converted into the dextrorotatory circularly polarized light and diffracts the dextrorotatory circularly polarized light in the direction (a downward direction in FIG. 10) opposite to the direction of arrow A to be converted into the levorotatory circularly polarized light.

As described above, in a case where the luminous fluxes emitted from the cores of the multi-core fiber 10 are unpolarized light, and the luminous flux 13a emitted from the core 11a is incident on the polarized light beam control element 14, the luminous flux 13a is separated into two luminous fluxes traveling in different directions.

Specifically, as illustrated in FIG. 10, the dextrorotatory circularly polarized light component of the luminous flux 13a is converted into the levorotatory circularly polarized light (first polarization state) to be diffracted downward (the direction opposite to the direction of arrow A) in FIG. 10 as the luminous flux 15a. Meanwhile, the levorotatory circularly polarized light component of the luminous flux 13a is converted into the dextrorotatory circularly polarized light (second polarization state) to be diffracted upward (the direction of arrow A) in FIG. 10 as the luminous flux 16a.

Similarly, in a case where the luminous flux 13b emitted from the core 11b is incident on the polarized light beam control element 14, the luminous flux 13b is separated into two luminous fluxes traveling in different directions. Specifically, as illustrated in FIG. 10, the dextrorotatory circularly polarized light component of the luminous flux 13b is converted into the levorotatory circularly polarized light to be diffracted downward (the direction opposite to the direction of arrow A) as the luminous flux 15b, and the levorotatory circularly polarized light component of the luminous flux 13b is converted into the dextrorotatory circularly polarized light to be diffracted upward (the direction of arrow A) in FIG. 10 as the luminous flux 16b.

The luminous flux 15a of the levorotatory circularly polarized light and the luminous flux 16a of the dextrorotatory circularly polarized light separated from the luminous flux 13a and the luminous flux 15b of the levorotatory circularly polarized light and the luminous flux 16b of the dextrorotatory circularly polarized light separated from the luminous flux 13b are then incident on the polarization-selective diffraction element 17, and the optical paths thereof are changed.

The luminous flux 15a of the levorotatory circularly polarized light is incident on the polarization-selective diffraction element 17 to be converted into the dextrorotatory circularly polarized light, and the optical path of the luminous flux 15a is changed to the upward direction (the direction of arrow A) in FIG. 10. The luminous flux converted from the luminous flux 15a is coupled to the coupled device 18b.

The luminous flux 16a of the dextrorotatory circularly polarized light is incident on the polarization-selective diffraction element 17 to be converted into the levorotatory circularly polarized light, and the optical path of the luminous flux 16a is changed to the downward direction (the direction opposite to the direction of arrow A) in FIG. 10. The luminous flux converted from the luminous flux 16a is coupled to the coupled device 18a.

The luminous flux 15b of the levorotatory circularly polarized light is incident on the polarization-selective diffraction element 17 to be converted into the dextrorotatory circularly polarized light, and the optical path of the luminous flux 15b is changed to the upward direction (the direction of arrow A) in FIG. 10. The luminous flux converted from the luminous flux 15b is coupled to the coupled device 18d.

Furthermore, the luminous flux 16b of the dextrorotatory circularly polarized light is incident on the polarization-selective diffraction element 17 to be converted into the levorotatory circularly polarized light, and the optical path of the luminous flux 16b is changed to the downward direction (the direction opposite to the direction of arrow A) in FIG. 10. The luminous flux converted from the luminous flux 16b is coupled to the coupled device 18c.

As described above, the diffraction angle of the optically anisotropic layer 26 changes in accordance with one period Λ and is increased as one period Λ is decreased.

Accordingly, by appropriately setting one period of the optically anisotropic layer 26 in the liquid crystal diffraction element constituting the polarized light beam control element 14, the traveling directions of the luminous flux 15a and the luminous flux 16a obtained by separating the luminous flux 13a and the traveling directions of the luminous flux 15b and the luminous flux 16b obtained by separating the luminous flux 13b can be adjusted to any directions.

In addition, by appropriately setting one period of the optically anisotropic layer 26 in the liquid crystal diffraction element constituting the polarization-selective diffraction element 17, the optical path of the luminous flux transmitted through the polarization-selective diffraction element 17 can be adjusted to any optical path in accordance with the positions of the coupled devices 18. For example, as illustrated in FIG. 10, the optical paths of the four luminous fluxes can be set to be parallel to each other by appropriately adjusting one period of the optically anisotropic layer 26 in accordance with the incidence angle of each luminous flux.

As a preferable aspect of the optical coupling system according to the embodiment of the present invention, the polarized light beam control element is preferably the liquid crystal diffraction element including the optically anisotropic layer having the liquid crystal alignment pattern in which the directions of the optical axes derived from the liquid crystal compounds change while continuously rotating in at least one direction in plane, as described above. In addition, as another preferable aspect, the polarization-selective diffraction element is preferably the liquid crystal diffraction element including the optically anisotropic layer having the liquid crystal alignment pattern in which the directions of the optical axes derived from the liquid crystal compounds change while continuously rotating in at least one direction in plane, as described above.

As a particularly preferable aspect, both of the polarized light beam control element and the polarization-selective diffraction element are the liquid crystal diffraction elements including the optically anisotropic layer having the liquid crystal alignment pattern in which the directions of the optical axes derived from the liquid crystal compounds change while continuously rotating in at least one direction in plane, as described above. In addition, the polarization-selective diffraction element may be formed to condense each luminous flux emitted from each core of the multi-core fiber or may be formed to collimate or condense the luminous fluxes from the coupled devices.

In a case where the polarized light beam control element is the above liquid crystal diffraction element and the first order light and the negative first order light of diffracted light are separated in accordance with their polarization for use, the circularly polarized light subsequently incident on the polarization-selective diffraction element has different rotation directions of the circularly polarized light like the levorotatory circularly polarized light and the dextrorotatory circularly polarized light.

Thus, the rotation directions of the optical axes (in-plane slow axes) of the optically anisotropic layer of the liquid crystal diffraction element constituting the corresponding polarization-selective diffraction element may be formed to be opposite to those of the polarized light beam control element (to form mirror symmetry). Alternatively, as in the above example, the liquid crystal diffraction element in which the rotation directions of the optical axes are the same (parallel symmetry) may be used as the polarized light beam control element and the polarization-selective diffraction element.

Meanwhile, in a case where the polarized light beam control element is the above liquid crystal diffraction element and the first order light (or the negative first order light) and the zero order light of diffracted light are used, the circularly polarized light subsequently incident on the polarization-selective diffraction element has the same rotation directions of the circularly polarized light as any of the dextrorotatory or levorotatory circularly polarized light.

Thus, the optical axes (in-plane slow axes) of the optically anisotropic layer of the liquid crystal diffraction element constituting the corresponding polarization-selective diffraction element are preferably formed to be the same as those of the polarized light beam control element (to form parallel symmetry).

In the optical coupling system 1 illustrated in FIG. 1, the luminous flux 15a and the luminous flux 16a are separated from the luminous flux 13a emitted from the core 11a of the multi-core fiber 10. Thus, the luminous flux 15a and the luminous flux 16a are luminous fluxes having the same signal. Similarly, the luminous flux 15b and the luminous flux 16b are separated from the luminous flux 13b emitted from the core 11b of the multi-core fiber 10. Thus, the luminous flux 15b and the luminous flux 16b are luminous fluxes having the same signal.

Figure 11:
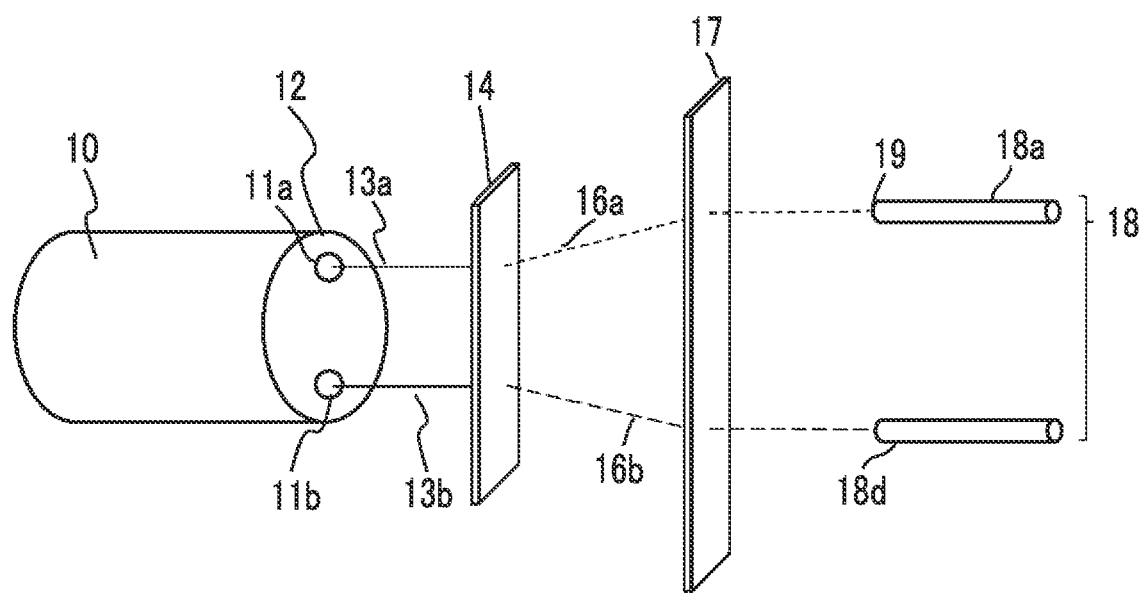
FIG. 11 is a conceptual diagram of another example of the optical coupling system according to the embodiment of the present invention.

Accordingly, in the optical coupling system according to the embodiment of the present invention, as conceptually illustrated in FIG. 11, for example, it may be configured to provide only the coupled device 18a and the coupled device 18d to use only the luminous flux 16a and the luminous flux 16b of which the optical paths are most different from each other.

In this case, unnecessary circularly polarized light (in the illustrated example, levorotatory circularly polarized light) may be removed using, for example, a method of disposing an absorptive circular polarization plate between the polarized light beam control element 14 and the polarization-selective diffraction element 17. Alternatively, for example, the luminous flux 15a and the luminous flux 15b may be absorbed using, for example, an absorption plate such as a black plate after being transmitted through the polarization-selective diffraction element 17.

In addition, in the optical coupling system according to the embodiment of the present invention, the polarized light beam control element 14 and the polarization-selective diffraction element 17 may include a plurality of optically anisotropic layers having different liquid crystal alignment patterns in plane in accordance with the incident luminous fluxes.

For example, the optically anisotropic layers having different liquid crystal alignment patterns are optically anisotropic layers of which one or more of the rotation directions of the optical axes, the direction (the direction of arrow A) in which the optical axes change while rotating, and one period in the liquid crystal alignment pattern are different.

For example, in the optical coupling system 1 of the illustrated example, the multi-core fiber 10 includes two of the core 11a and the core 11b. Accordingly, the polarized light beam control element 14 may include two optically anisotropic layers of an optically anisotropic layer having a liquid crystal alignment pattern corresponding to the luminous flux 13a and an optically anisotropic layer having a liquid crystal alignment pattern corresponding to the luminous flux 13b in plane in accordance with incidence positions of the luminous flux 13a and the luminous flux 13b.

In addition, in the optical coupling system 1 of the illustrated example, four luminous fluxes are incident on the polarization-selective diffraction element 17, and the polarization-selective diffraction element 17 controls the optical path of each luminous flux to be incident on the coupled device corresponding to each luminous flux.

Accordingly, the polarization-selective diffraction element 17 may include four optically anisotropic layers having liquid crystal alignment patterns different from each other in plane in accordance with the incidence position of each luminous flux and the positions of the corresponding coupled devices. Alternatively, the polarization-selective diffraction element 17 may include two optically anisotropic layers having liquid crystal alignment patterns different from each other in plane such that one optically anisotropic layer corresponds to two luminous fluxes. Alternatively, the polarization-selective diffraction element 17 may include three optically anisotropic layers having liquid crystal alignment patterns different from each other in plane, including an optically anisotropic layer corresponding to one luminous flux, an optically anisotropic layer corresponding to one luminous flux, and an optically anisotropic layer corresponding to two luminous fluxes.

<Optical Communication Device>

An optical communication device according to the embodiment of the present invention can be configured by incorporating the optical coupling system according to the embodiment of the present invention described above into an optical communication device that requires optical coupling between a multi-core fiber and various devices. While the optical communication device according to the embodiment of the present invention is connected to a processing operation apparatus to constitute an optical communication system, the optical communication device has a simple configuration and a small size. Thus, a communication capacity per mounting size can be increased, and this contributes to a high capacity of communication infrastructure.

In addition, the optical coupling system according to the embodiment of the present invention can be applied to an optical computer in which an operation circuit is configured with an optical circuit, and a quantum computer using a principle of the optical computer. Those skilled in the art may sufficiently perceive advantages obtained by the ability to simplify a structure and reduce the mounting size using the optical coupling system according to the embodiment of the present invention.

EXPLANATION OF REFERENCES

1: optical coupling system
10: multi-core fiber
11a, 11b: core
12: light incident and emission surface
13a, 13b: luminous flux
14: polarized light beam control element
15a, 15b, 16a, 16b: luminous flux
17: polarization-selective diffraction element
18: coupled device
19: light incident and emission surface
20: support
24: alignment film
26: optically anisotropic layer
30: liquid crystal compound
30A: optical axis
60: exposure device
62: laser
64: light source
65: $\lambda/2$ plate
68: polarized light beam control element
70A, 70B: mirror
72A, 72B: $\lambda/4$ plate
80: exposure device
82: laser
84: light source
86, 94: polarized light beam control element
90A, 90B: mirror
92: lens
96: $\lambda/4$ plate
103, 105, 107: signal light
104: liquid crystal diffraction element
601: optically anisotropic layer
605: liquid crystal compound
610: transparent substrate
615: surface
$L_1$, $L_4$: incidence ray
$L_2$, $L_5$: transmitted ray
Q1, Q2: absolute phase
E1, E2: equiphase plane
$G_R$: dextrorotatory circularly polarized light of green light
M: laser light
MA, MB: ray
MS: S polarized light
MP: P polarized light
$P_O$: linearly polarized light
$P_R$: dextrorotatory circularly polarized light
$P_L$: levorotatory circularly polarized light

What is claimed is:

1. An optical coupling system comprising:
a polarized light beam control element facing a light incident and emission surface of a multi-core fiber;
a polarization-selective diffraction element positioned on a side of the polarized light beam control element opposite to the emission surface of the multi-core fiber;
a plurality of coupled devices having light incident and emission surfaces facing the polarization-selective diffraction element;
an incidence side $\lambda/4$ wavelength plate positioned on a side of the polarized light beam control element opposite to the polarization-selective diffraction element; and
an emission side $\lambda/4$ wavelength plate positioned on a side of the polarization-selective diffraction element opposite to the polarized light beam control element.

2. The optical coupling system according to claim 1, wherein the polarized light beam control element is a liquid crystal diffraction element including an optically anisotropic layer having a liquid crystal alignment pattern in which a direction of an optical axis derived from a liquid crystal compound changes while continuously rotating in at least one direction in plane.

3. The optical coupling system according to claim 2, wherein the polarization-selective diffraction element is a liquid crystal diffraction element including an optically anisotropic layer having a liquid crystal alignment pattern in which a direction of an optical axis derived from a liquid crystal compound changes while continuously rotating in at least one direction in plane.

4. An optical communication device comprising:
the optical coupling system according to claim 2.

5. The optical coupling system according to claim 2, wherein the polarized light beam control element transmits incidence rays while converging or diverging the incidence rays depending on polarization.

6. The optical coupling system according to claim 5, wherein the polarized light beam control element transmits incidence rays while converging or diverging the incidence rays depending on a rotation direction of circular polarization.

7. The optical coupling system according to claim 6, wherein the polarized light beam control element comprises a concentric liquid crystal alignment pattern.

8. The optical coupling system according to claim 1, wherein the polarization-selective diffraction element is a liquid crystal diffraction element including an optically anisotropic layer having a liquid crystal alignment pattern in which a direction of an optical axis derived from a liquid crystal compound changes while continuously rotating in at least one direction in plane.

9. An optical communication device comprising:
the optical coupling system according to claim 3.

10. The optical coupling system according to claim 8, wherein the polarization-selective diffraction element transmits incidence rays while converging or diverging the incidence rays depending on polarization.

11. The optical coupling system according to claim 10, wherein the polarization-selective diffraction element transmits incidence rays while converging or diverging the incidence rays depending on a rotation direction of circular polarization.

12. The optical coupling system according to claim 11, wherein the polarization-selective diffraction element comprises a concentric liquid crystal alignment pattern.

13. An optical communication device comprising:
the optical coupling system according to claim 1.

* * * * *